(12) United States Patent
Kojima et al.

(10) Patent No.: US 8,199,354 B2
(45) Date of Patent: Jun. 12, 2012

(54) PRINTER, CONTROL METHOD, AND USED AMOUNT ACQUIRING METHOD FOR OUTPUTTING AN AMOUNT OF USE OF A PRINTER

(75) Inventors: Teruhito Kojima, Suwa (JP); Toshimitsu Moritaku, Suwa (JP); Yasumasa Nakajima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/013,186

(22) Filed: Jan. 25, 2011

(65) Prior Publication Data

US 2011/0128582 A1 Jun. 2, 2011

(51) Int. Cl.
G06F 3/12 (2006.01)
(52) U.S. Cl. ...................................... 358/1.15
(58) Field of Classification Search ............ 358/1.1, 358/1.12, 1.13, 1.15; 347/86
See application file for complete search history.

(56) References Cited

U.S. PATENT DOCUMENTS

| 2002/0040303 A1* | 4/2002 | Hamamura et al. ........... 705/1 |
| 2002/0085840 A1 | 7/2002 | Liebenow |
| 2002/0175208 A1 | 11/2002 | Bartley et al. |

FOREIGN PATENT DOCUMENTS

| EP | 1174271 | * | 1/2002 |
| EP | 1174271 A | | 1/2002 |
| EP | 1184181 B | | 3/2002 |
| JP | 10-269415 A | | 10/1998 |
| JP | 2002-049472 A | | 2/2002 |
| JP | 2002-215366 A | | 8/2002 |
| JP | 2002-215368 A | | 8/2002 |
| JP | 2003-066796 A | | 3/2003 |
| JP | 200384959 A | | 3/2003 |
| JP | 2003122209 A | | 4/2003 |
| JP | 2003-308411 A | | 10/2003 |
| JP | 2004-112084 A | | 4/2004 |

* cited by examiner

Primary Examiner — Benny Q Tieu
Assistant Examiner — Jeremiah Bryar
(74) Attorney, Agent, or Firm — Nutter McClennen & Fish LLP; John J. Penny, Jr.; Christina M. Sperry

(57) ABSTRACT

There is provided a printer that performs print on a medium by color materials, including: an advance information reading and writing section that reads and writes advance information from and in an advance information holder for storing the advance information; a print control section that outputs a print driving controlling print when the advance information is read by the advance information reading and writing section; and a used amount acquiring section that acquires a used amount for the printer based on the print driving signal output from print control section.

24 Claims, 22 Drawing Sheets

FIG. 10A

| 1054 | | 1170 | |
|---|---|---|---|
| IC CREDIT | 27 | READ CREDIT | 0(INITIAL VALUE) |
| | | USED CREDIT | 0(INITIAL VALUE) |
| | | AFTER-CLEANING CREDIT | 0(INITIAL VALUE) |

FIG. 10B

| IC CREDIT | 17 | READ CREDIT | 10 |
|---|---|---|---|
| | | USED CREDIT | 0(INITIAL VALUE) |
| | | AFTER-CLEANING CREDIT | 0(INITIAL VALUE) |

FIG. 10C

| IC CREDIT | 17 | READ CREDIT | 10 |
|---|---|---|---|
| | | USED CREDIT | 3 |
| | | AFTER-CLEANING CREDIT | 7 |

FIG. 10D

| IC CREDIT | 7 | READ CREDIT | 20 |
|---|---|---|---|
| | | USED CREDIT | 9 |
| | | AFTER-CLEANING CREDIT | 11 |

FIG. 10E

| IC CREDIT | 7 | READ CREDIT | 20 |
|---|---|---|---|
| | | USED CREDIT | 14 |
| | | AFTER-CLEANING CREDIT | 6 |

FIG. 10F

| IC CREDIT | 0 | READ CREDIT | 27 |
|---|---|---|---|
| | | USED CREDIT | 14 |
| | | AFTER-CLEANING CREDIT | 13 |

FIG. 10G

| IC CREDIT | 0 | READ CREDIT | 27 |
|---|---|---|---|
| | | USED CREDIT | 22 |
| | | AFTER-CLEANING CREDIT | 5 |

| IC CREDIT | 1000 |

1170

| READ CREDIT | 27 |
| USED CREDIT | 22 |
| AFTER-CLEANING CREDIT | 5 |

FIG. 11B

| IC CREDIT | 990 |

| READ CREDIT | 37 |
| USED CREDIT | 26 |
| AFTER-CLEANING CREDIT | 11 |

FIG. 11C

| IC CREDIT | 1001 |

| READ CREDIT | 0(INITIAL VALUE) |
| USED CREDIT | 0(INITIAL VALUE) |
| AFTER-CLEANING CREDIT | 0(INITIAL VALUE) |

FIG. 12A

| | 1054 | | 1170 | |
|---|---|---|---|---|
| | IC CREDIT | 8 | READ CREDIT | 27 |
| | | | USED CREDIT | 22 |
| | | | AFTER-CLEANING CREDIT | 5 |

FIG. 12B

| | IC CREDIT | 0 | READ CREDIT | 35 |
|---|---|---|---|---|
| | | | USED CREDIT | 22 |
| | | | AFTER-CLEANING CREDIT | 13 |

FIG. 12C

| | IC CREDIT | 0 | READ CREDIT | 35 |
|---|---|---|---|---|
| | | | USED CREDIT | 26 |
| | | | AFTER-CLEANING CREDIT | 9 |

FIG. 12D

| | IC CREDIT | 9 | READ CREDIT | 0(INITIAL VALUE) |
|---|---|---|---|---|
| | | | USED CREDIT | 0(INITIAL VALUE) |
| | | | AFTER-CLEANING CREDIT | 0(INITIAL VALUE) |

FIG. 14A

1054
| IC CREDIT | 1000 |

1170
| READ CREDIT | 27 |
| USED CREDIT | 22 |
| AFTER-CLEANING CREDIT | 5 |

FIG. 14B

1054
| IC CREDIT | 1005 |

1170
| READ CREDIT | 0 (INITIAL VALUE) |
| USED CREDIT | 0 (INITIAL VALUE) |
| AFTER-CLEANING CREDIT | 0 (INITIAL VALUE) |

FIG. 14C

1054
| IC CREDIT | 1 |

1170
| READ CREDIT | 27 |
| USED CREDIT | 22 |
| AFTER-CLEANING CREDIT | 5 |

FIG. 14D

1054
| IC CREDIT | 0 (INITIAL VALUE) |

1170
| READ CREDIT | 28 |
| USED CREDIT | 22 |
| AFTER-CLEANING CREDIT | 6 |

2190

| READ CREDIT | 0 (INITIAL VALUE) |
|---|---|
| USED CREDIT | 0 (INITIAL VALUE) |
| AFTER-CLEANING CREDIT | 0 (INITIAL VALUE) |

| PRINTER ID | GP012345678 |
|---|---|
| OUTPUT DUE DATE | 2007.03.31  12 : 00 |
| ACTUAL OUTPUT DATE | 2006.03.31  12 : 00 |
| USED CREDIT | 0 (INITIAL VALUE) |

FIG. 19

PRINTER, CONTROL METHOD, AND USED AMOUNT ACQUIRING METHOD FOR OUTPUTTING AN AMOUNT OF USE OF A PRINTER

CROSS REFERENCE TO RELATED APPLICATIONS

The present application claims priority from Japanese Patent Applications No. 2005-360751 filed on Dec. 14, 2005, No. 2006-102532 filed on Apr. 3, 2006 and No. 2006-162676 filed on Jun. 12, 2006, the contents of which are incorporated herein by reference.

BACKGROUND

1. Field of the Invention

The present invention relates to a printer, a printing method, a used amount acquiring method, a used amount acquiring system, a prepaid card, a control method of the printer, a print accounting method, and a program. More particularly, the present invention relates to a technique performing accounting for advance information previously paid when printing an image.

Moreover, the present invention relates to a printer, a used amount acquiring method, a program, and a used amount acquiring system for outputting a used amount showing an amount of use of the printer to the outside.

2. Related Art

An accounting method for copying machine proposed by Xerox company has been in common use in the office machine industry since the 20th century. As this accounting method, the following two methods have been selected.

These are (1) page-unit accounting by counter charge and (2) accounting through consumables sale by toner (ink) supply. In recent years, according to the advent of a printer for computers, there is a movement to change an accounting method itself from these account methods to new methods.

The first method is a method referred to as a Pay Per Print method, and this reproduces the above-described accounting method (1) proposed by Xerox company. A maker side supplies apparatuses and consumables to a market place without charge or in cheap price, and levies predetermined amount of money whenever print is performed by one page. According to this method, since an accounting base that is an origin of a profit is not linked with a price of consumables, consumables can be circulated in a price that lightens a burden imposed on a user, and further since accounting is performed every printed page, the user hardly has a loss.

However, this method has a problem related to "confirmation of process completion" such as how to recognize whether one-page print has been completed and how to assure whether this page has been surely printed. For example, when the printer is jammed during printing, the page must be excluded from an accounting target. Moreover, when toner (ink) is completely consumed before one-page print is competed, there are many issues to be inspected such as how to provide the recovery means or how to process accounting at that time.

Moreover, correspondence against unjust use is difficult. For example, in case of printing only one-page manuscript with an A4 size, since it cannot be considered that one-page print has been completed when print started by allotting the manuscript to either of facing two A4 pages on A3-size paper, a power source of the printer is cut at the time point at which the desired manuscript page has been completely printed (the time point at which one-half process for the A3 paper has been completed), and the printer paper is discharged from the printer, the printer is falsely utilized without charging a fee. Although there is also considered a method for analyzing data of a manuscript and charging a fee in a manuscript data unit in order to prevent this, the realization of this method is difficult because there is required a system that does not charge a fee when print output matter is not normally obtained due to paper jam and toner (ink) consumption described above and thus system construction for that purpose becomes extremely complicated.

Besides, there has been proposed some methods for charging a fee in a predetermined process unit as a Pay Per Process method rather than Pay Per Print method. For example, this is a method for accurately measuring an amount of consumption of consumables and charging a fee according to the measured result. Various ideas have been proposed for a method for measuring a used amount for toner or ink and charging a fee at a metered rate. In this method, since the accounting itself is performed according to the operation of process, consumables can be circulated in a price that lightens a burden imposed on a user, similarly to the case of Pay Per Print, and further the user hardly has a loss because accounting is performed every printed amount. Furthermore since a guaranteed unit is not required for one-page print output matter, it is necessary to have a complicated control system such as a system in a Pay Per Print method. As an existing proposed example related to a Pay Per Process method, there is known, for example, a method as described in Japanese Patent Application Publication 2002-215368.

This document discloses a method for charging a fee at a metered rate according to a used amount for a printer, specifically, for charging a fee according to a count number of dots for every color ink.

However, both a Pay Per Print method and a Pay Per Process method mutually have a problem that there is required a structure related to the return of profits according to circulation of consumables. In both methods, since a fee is received from a user after this print, a structure for collecting the fee must be created. A system of Xerox company adopts a method for equipping copying machine with an incremental counter and regularly checking the counter by a serviceman to ask a user for an amount of accounting or a method for online acquiring the counter value and asking a user for an amount of accounting instead of a visit of a serviceman.

The recent suggestion is mainly a method for charging a fee by the latter online check, and according to this, there is proposed a method for solving various problems of a Pay Per Print method by referring to a status log in a copying machine (for example, subtracting the count number corresponding to log when the log of paper jam is left).

Moreover, there must be considered a method for returning a profit according to the collected fee to an intermediary agent such as a dealer. In the above-described both methods, in order to manage which intermediary agent receives the collected fee, a system capable of managing what is ID of inter-mediary agent and who is an agent related to the collected amount of money according to the use of a predetermined printer must be constructed, managed, and maintained.

Although these problems are not a problem according to a configuration of a. printer itself, these problems cannot be ignored in view of the whole of a service system for supporting the successive use of printer. As a specific example, although a method for charging a fee is changed in what manner, the circulation of consumables must be realized so that a user can obtain the consumables sufficiently and easily in terms of usability. For example, a user is inconvenient in a state where an order is online performed when ink has been completely consumed and thus an article of order barely arrives at the orderer the next day or the day after next. As a method for solving a problem of such a circulation, there is proposed a system that predicts the day when consumables disappear and preliminarily promotes the purchase or informs a user of the fact. However, in order to operate such a prediction system, it is necessary to provide a structure that predicts the day when consumables disappear somewhere and also to provide a structure that gives some kind of alarm or services from consumables supplier side to a user according to the result. Therefore, a maintainable system capable of obtaining necessary consumables any time from the nearest dealer is the most ideal system. However, in case of the above-described both methods, since a profit is not generated by the only supply of consumables, the circulation of consumables does not become a profit. In order that the nearest dealer to a user is associated with the circulation of consumables, it is necessary to develop a new structure for promoting the circulation of consumables and bringing a profit to a dealer.

SUMMARY

Therefore, an advantage of some aspects of the invention is to provide a technique for solving problems of the above-described conventional art, promoting the circulation of consumables, and bringing a profit to a dealer.

To solve at least a part of the above problems, according to the first aspect of the present invention, there is provided a printer that performs print on a medium by color materials. The printer includes: an advance information reading and writing section that reads and writes advance information from and in an advance information holder tor storing the advance information; a print control section that outputs a print driving signal controlling print when the advance information is read by the advance information reading and writing section; and a used amount acquiring section that acquires a used amount for the printer based on the print driving signal output from the print control section.

The printer may further include: an advance information holder receiving section, an accounting information storing section that stores the read advance information; a print driving signal acquiring section that acquires the print driving signal output from the print control section; and an arithmetic section that adds and subtracts the accounting information converted from the used amount for the printer to and from the advance information stored on the accounting information storing section, in which the advance information reading and writing section may read and write the advance information from and in the advance information holders inserted in the advance information holder receiving section, and the used amount acquiring section may operate as a print driving signal converting section that converts the print driving signal acquired by the print driving signal acquiring section into the accounting information.

Since such a printer withdraws accounting information according to a print amount from the advance information holder, it is possible to perform accounting related to print by means of the sale of the advance information holder in place of the sale of consumables. Therefore, consumables can be circulated at a price with a few burdens. Moreover since a dealer can obtain a profit according to the sale of the advance information holder even if a profit is not obtained by the circulation of consumables, it is possible to promote the circulation of consumables and thus bring the dealer a profit.

In the first embodiment of the present invention, it is preferable that the advance information holder is a prepaid card. The reason is that the prepaid card is easily handled and can perform the exchange of accounting information.

In the first embodiment of the present invention, the printer may consist of an ink-jet printer, and the print driving signal may be a printing nozzle driving signal in the ink-jet printer. When the printer is an ink-jet printer, the reason is that a printing nozzle driving signal is used as a print driving signal.

In the first embodiment of the present invention, a reading unit of the advance information may be an amount corresponding to a driving amount required for one raster print in case of the print driving signal conversion. When the printer is an ink-jet printer, the reason is that accounting by one raster unit is suitable for an accounting management.

In the first embodiment of the present invention, the printer may consist of a laser beam printer, and the print driving signal pulse driving signal in the laser beam printer. When the printer is a laser beam printer, the reason is that a laser pulse driving signal is used as a print driving signal.

In the first embodiment of the present invention, a reading unit of the advance information may be an amount corresponding to a driving amount required for one page print in case of the print driving signal conversion. When the printer is a laser beam printer, the reason is that accounting by one page unit is suitable for an accounting management.

In the first embodiment of the present invention, the rest of advance information may be written back in the advance information holder based on the computed result by the arithmetic section. In this manner, although the advance information holder is detached from the printer by writing back the rest of accounting information in the advance information holder, advance information is not left in the printer.

In the first embodiment of the present invention, the printer may further include: a cartridge accommodating section that detachably accommodates a cartridge for accommodating the color materials; a print section that performs print by means of the color materials in the cartridge based on the print driving signal out from the print control section; and a clearing section that clears the advance information read by the advance information reading and writing section by accounting information according to the used amount for the printer. Moreover, the print control section may output a print driving signal controlling print when the advance information of a reading unit is read by the advance information reading and writing section, the used amount acquiring section may operate as a print driving signal converting section that converts the print driving signal acquired by the print driving signal acquiring section into the accounting information, and the advance information reading and writing section may read the advance information every predetermined reading unit from the advance information holder for storing advance information, and temporarily store the read advance information and accumulate the stored information to the advance information newly read from the advance information holder when the advance information stored on the advance information holder does not reach the reading unit. In this way, it is possible to use a remanent small quantity of credit.

The advance information reading and writing section may write the accumulated advance information in a new advance information holder. In this way, the remanent small quantity of credit can be used in the cartridge to which a new advance information storing section is attached.

The advance information holder may be attached to the cartridge. In this way, it is possible to use the remanent small quantity of credit while controlling a mechanical change point in the printer.

The print section may have a print head for discharging color materials to the medium while reciprocating over the medium, and the advance information reading and writing section may read the advance, information corresponding to the number of discharges performed for a round of the print head as the predetermined reading unit. In this way, in printer system using a print fee in one round unit, it is possible to use a credit not reaching an amount corresponding to one-round print.

The printer may print the medium in a page unit, and the advance information reading and writing section may read the advance information corresponding to a print amount of a page unit as the predetermined reading unit. In this way, in a printer system using a print fee in a page unit, it is possible to use a credit not reaching an amount corresponding to one-page print.

In the first embodiment of the present invention, the printer may further include: an advance information holder receiving section; an accounting information storing section that stores the advance information read by the advance information reading and writing section; a print driving signal acquiring section that acquires the print driving signal output from the print control section; a print driving signal converting section that converts the print driving signal acquired by the print driving signal acquiring section into the accounting information; and an arithmetic section that adds and subtracts the accounting information converted by the print driving signal converting section to and from the advance information stored on the accounting information storing section, and the advance information reading and writing section may read and write advance information from and in the advance information holder inserted in the advance information holder receiving section.

In the second embodiment of the present invention, there is provided a printer that performs print on a medium by color materials, including: a cartridge accommodating section that detachably accommodates a cartridge for accommodating the color materials; an advance information reading and writing section that reads and writes advance information from and in an advance information holder for storing the advance information; a print control section that outputs a print driving signal controlling print when the advance information is read by the advance information reading and writing section; a print section that performs print by means of the color materials in the cartridge based on the print driving signal output print control section; a used amount acquiring section that acquires a used amount showing an amount by which the printer is used based on the print driving signal output from the print control section; a used amount storing section that stores the used amount acquired by the used amount acquiring section; and a used amount output section that outputs the used amount stored on the used amount storing section to the outside. In this way, it is possible to grasp a used amount for the printer. Particularly, an offerer of the printer can grasp a used amount for the printer by outputting the used amount for printer to the offerer of the printer.

The used amount storing section may further store output presence information showing whether the used amount has been output to the outside by the used amount output section, and the print control section may output the print driving signal when the output presence information showing that the used amount has been output to the outside by the used amount output section is stored on the used amount storing section. In this way, since the print can be permitted on condition that a used amount for the printer is output, an offerer of the printer can grasp the used amount for the printer with high accuracy.

The used amount output section may output the used amount to the outside in association with identification information identifying the printer. In this way, an offerer of the printer can grasp the presence of output of a used amount according to the printer. Moreover it is possible to grasp a used amount according to the printer.

The used amount output section may output the used amount to the outside at a predetermined date and time. In this way, an offerer of the printer can regularly grasp a used amount for the printer.

The print control section may output the print driving signal when being connected to the outside. In this way, is possible to always grasp a used amount for the printer when the printer is used.

The used amount acquiring section may include: a print amount acquiring section that acquires a print amount showing an amount of print by the print section, which is included in the print driving signal output from the print control section; and an accounting information converting section that acquires accounting information obtained by converting the print amount based on the print amount acquired by the print amount acquiring section, and the used amount storing section may store the accounting information acquired by the accounting information converting section as the used amount. In this way, as a used amount for the printer, it is possible to grasp an amount of consumption of a credit.

The used amount acquiring section may acquire a print amount showing an amount of print by the print section, which is included in the print driving signal output from the print control section, and the used amount storing section may store the print amount acquired by the used amount acquiring section as the used amount. In this way, as a used amount for the printer, it is possible to grasp a print amount of the printer.

In an embodiment of the third of the present invention, there is provided a printer that prints an image by means of a print section, including a prepaid card accessing section that accesses a prepaid card, a print control section that evolves a measured value related to a print amount based on a driving signal to be supplied to the print section, and a control section that increases and decreases a remaining amount of a credit stored on the accessed prepaid card based on the evolved measured value.

In this manner, in the third embodiment, the prepaid card accessing section accesses the prepaid card, and also the print control section evolves a measured value related to a print amount at that time based on a driving signal to be supplied to the print section during printing, and the control section increases and decreases a remaining amount of a credit stored on the accessed prepaid card based on the evolved measured. value. Here, a credit means an amount of money that is stored as advance information.

Since a credit according to a print amount is withdrawn from the prepaid card by the introduction of the printer according to the third embodiment with such a configuration, accounting related to print can be performed by the sale of prepaid card in place of the sale of consumables. Therefore, consumables can be circulated at a price with a few burdens. Moreover, since a dealer can obtain profits by a sale of the prepaid card even if profits are not obtained by circulation of consumables circulation of consumables can be promoted and the dealer can also obtain profits.

In the third embodiment of the present invention, the print section may include an ink-jet head, and the print control section may count the number of head shots in the ink-jet head based on the driving signal to be supplied to the ink-jet head and evolve the counted number of head shots as the measured value.

In this manner, the reason is that the number of head shots in the ink-jet head is an index reflecting a real print amount when the printer is so-called ink-jet method.

In the third embodiment of the present invention, the print section may include a light source that irradiates a light ray on a photo conductor, and the print control section may accumulate an irradiation time of the light ray from the light source based on the driving signal to be supplied to the light source and evolve the accumulated irradiation time as the measured value.

In this manner, the reason is that it is conceivable that the accumulated irradiation time of the light ray from the light source is an index reflecting a real print amount when the printer is so-called laser method.

In the fourth embodiment of the present invention, a printer for printing an image withdraws a credit according to the print amount from a prepaid card by accessing the prepaid card whenever the print for a predetermined amount is completed when the prepaid card is arranged to be able to be accessed.

In this manner, since a credit according to a print amount is withdrawn from the prepaid card arranged to be able to accessed by the introduction of the printer according to the fourth embodiment, accounting related to print can be performed by the sale of prepaid card similarly to the case of the printer according to the first embodiment. Therefore, since a dealer can obtain profits by a sale of the prepaid card even if profits are not obtained by circulation of consumables, circulation of consumables can be promoted and the dealer can also obtain profits.

In an embodiment of the fifth of the present invention, there is provided prepaid card used in a printer that prints an image, storing information of a credit that is increased and decreased according to a print amount in the printer; model information showing the type of printer to which the prepaid card can be applied; and authentication information showing that the card is a regular prepaid card.

In this manner, an accounting process can be performed on the print of image performed in the printer by means of the prepaid card by including information of the credit capable of being increased and decreased according to a print amount in the printer. Moreover, when the prepaid card is used in the printer by including model information and authentication information, it is possible to easily judge whether the card matches the printer from these information.

In the sixth embodiment of the present invention, there is provided a control method of a printer that prints art image, including: (a) reading and writing advance information from an advance information holder inserted into an advance information holder receiving section; (b) storing the read advance information on an accounting information storing section; (c) acquiring a print driving signal output from a print control section, (d) converting the acquired print driving signal into accounting information, (e) and adding and subtracting the converted accounting information to and from the advance information stored on the accounting information storing section.

In the seventh embodiment of the present invention, there is provided a control method of a printer that prints an image by means of a print section, including: (a) accessing a prepaid card; (b) evolving a measured value related to a print amount based on a driving signal to be supplied to the print section; (c) and increasing and decreasing a remaining amount of a credit stored on the accessed prepaid card based on the measured value.

In the eighth embodiment of the present invention, there is provided a print accounting method for charging a fee for print of an image performed in a printer, including: a) providing a prepaid card for value; (b) arranging the provided prepaid card for the printer so as to be accessed from the printer; and (c) withdrawing a credit according to the print amount from the prepaid card by the access from the printer whenever the print of a predetermined amount is completed in the printer.

In order to solve the above problem, in the ninth aspect of the present invention, there is provided a printing method for performing print on a medium by color materials by means of a printer having a cartridge accommodating section that detachably accommodates a cartridge accommodating the color materials, including: an advance information reading and writing procedure of reading advance information every predetermined reading unit from an advance information holder for storing advance information; a print control procedure of outputting a print driving signal controlling print when advance information of a reading unit is read in the advance information reading and writing procedure; a print procedure of performing print by means of the color materials in the cartridge based on the print driving signal output in the print control procedure; a print driving signal converting procedure of acquiring the print driving signal output in the print control procedure and converting the print driving signal into accounting information; and a clearing procedure of clearing the advance information read in the advance information reading and writing procedure by the accounting information converted in the print driving signal converting procedure, and the advance information reading and writing procedure temporarily stores the read advance information and accumulates the stored information to advance information newly read from the advance information holder when the advance information stored on the advance information holder does not reach a reading unit.

In order to solve the above problem, in the tenth aspect of the present invention, there is provided a program for performing print on a medium by color materials, the program making a printer having a cartridge accommodating section that detachably accommodates a cartridge accommodating the color materials execute: an advance information reading and writing procedure of reading advance information every predetermined reading unit from an advance information holder for storing advance information; a print control procedure of outputting a print driving signal controlling print when advance information of a reading unit is read in the advance information reading and writing procedure; print procedure of performing print by means of the color materials in the cartridge based on the print driving signal output in the print control procedure; a print driving signal converting procedure of acquiring the print driving signal output in the print control procedure and converting the print driving signal into accounting information; and a clearing procedure of clearing the advance information read in the advance information reading and writing procedure by the accounting information converted in the print driving signal converting procedure, and the advance information reading and writing procedure temporarily stores the read advance information and accumulates the stored information to advance information newly read from the advance information holder when the advance information stored on the advance information holder does not reach a reading unit.

In order to solve the above problem, in the eleventh aspect of the present invention, there is provided a used amount acquiring method for acquiring a used amount for a printer, including: reading and writing advance information from and in an advance information holder for storing the advance information; outputting a print driving signal controlling print when the advance information is read in the advance information reading and writing step; performing the print by means of color materials in a cartridge for accommodating the color materials based on the print driving signal output in the print controlling step; acquiring a used amount showing an amount by which the printer is used based on the print driving signal output in the print controlling step; storing the used amount acquired in the used amount acquiring step; and outputting the used amount stored in the used amount storing step to the outside. In this way, it is possible to obtain an effect equal to that of the second embodiment.

In order to solve the above problem, in the twelfth aspect of the present invention, there is provided program for controlling a printer that performs print on a medium by color materials, the program making the printer execute: reading and writing advance information from and in an advance information holder storing the advance information; outputting a print driving signal controlling print when the advance information is read in the advance information reading and writing step; performing the print by means of color materials in a cartridge for accommodating the color materials based on the print driving signal output in the print controlling step; acquiring a used amount showing an amount by which the printer is used based on the print driving signal output in the print controlling step; storing the used amount acquired in the used amount acquiring step; and outputting the used amount stored in the used amount storing step to the outside. In this way, it is possible to obtain an effect equal to that of the second embodiment.

In order to solve the above problem, in the thirteenth aspect of the present invention, there is provided a used amount acquiring system having a printer that performs print on a medium by color materials and a server that is connect to the printer via a network, the printer including: a cartridge accommodating section that detachably accommodates a cartridge for accommodating the color materials; an advance information reading and writing section that reads and writes advance information from and in an advance information holder for storing the advance information; a print control section that outputs a print driving signal controlling print when the advance information is read by the advance information reading and writing section; a print section that performs print by means of the color materials in the cartridge based on the print driving signal output from the print control section; a used amount acquiring section that acquires a used amount showing an amount of the use of the printer based on the print driving signal output from the print control section; a used amount storing section that stores the lased amount acquired by the used amount acquiring section; and a used amount output section that outputs the used amount stored on the used amount storing section to the outside, and the server including: a sold advance information acquiring section that acquires sold advance information; a used amount acquiring section that acquires the used amount output from the printer; and an unused advance information output section that computes and outputs unused advance information for which the use has not been confirmed among the sold advance information based on the sold advance information acquired by the sold advance information acquiring section and the used amount acquired by the used amount acquiring section. In this way, it is possible to obtain an effect equal to that of the second embodiment.

In the fourteenth aspect of the present invention, there is provided a control method of a printer that performs print on a medium by color materials, including: reading and writing advance information from and in an advance information holder for storing the advance information; outputting a print driving signal controlling print when the advance information is read; and acquiring a used amount for the printer based on the output print driving signal.

In the fourteenth aspect of the present invention, the control method may further include: receiving the advance information holder; storing the read advance information; acquiring the output print driving signal; adding and subtracting the accounting information converted from the used amount for the printer from the stored advance information, the reading and writing step may include reading and writing the advance information from and in the inserted advance, information holder, and the acquiring step may include converting the acquired print driving signal into the accounting information.

A reading unit of the advance information may be an amount corresponding to a driving amount required for one raster print in case of the print driving signal conversion.

A reading unit of the advance information may be an amount corresponding to a driving amount required for one page print in case of the print driving signal conversion.

In the fourteenth aspect of the present invention, the control method may further include writing back the rest of advance information in the advance information holder based on the computed result in the adding and subtracting step.

In the fourteenth aspect of the present invention, the printer may include a cartridge accommodating section that detachably accommodates a cartridge accommodating color materials, the control method of the printer may further includes: performing print by means of the color materials in the cartridge based on the print driving signal; and clearing the read advance information by accounting information according to used amount for the printer, the outputting step may include outputting a print driving signal controlling print when the advance information of a predetermined reading unit has been read, the acquiring step may include converting the acquired print driving signal into the accounting information, the reading and writing step may include reading the advance information every predetermined reading unit from the advance information holder storing the advance information and temporarily storing the read advance information and accumulating the stored information to the advance information newly read from the advance information holder when the advance information stored on the advance information holder does not reach the reading unit.

The reading and writing step may include writing the accumulated advance information in a new advance information holder.

The advance information holder may be attached to the cartridge.

The printing step may include discharging the color materials on the medium while reciprocating a print head, and the reading and writing step may include reading the advance information corresponding to the number of discharges performed for a round of the print head as the predetermined reading unit.

In the fourteenth aspect of the present invention, the printer may print the medium in a page unit, and the reading and writing step in the control method of the printer may include reading the advance information corresponding to an amount of print of a page unit as the predetermined reading unit.

The control method of the printer according to the fourteenth aspect of the present invention further include: storing the read advance information; acquiring the output print driving signal; converting the acquired print driving signal into accounting information; and adding and subtracting the converted accounting information to and from the stored advance information, and the reading and writing step may include reading and writing the advance information from and in the inserted advance information holder.

In addition, the present invention is not limited to an aspect according to an apparatus invention such as the described printer or an aspect according to a method invention such as a control method, and can be realized with various aspects. For example, the invention can be realized with various aspects such as an aspect as a computer program for constructing these method and apparatus, an aspect as a recording medium recording such a computer program, and data signals that includes the computer program and are implemented in a carrier wave.

The summary does not necessarily describe all necessary features of the present invention. The present invention may also be a sub-combination of the features described above.

BRIEF DESCRIPTION OF THE DRAWINGS

FIGS. 10A to 10G are pattern diagrams showing a change of each credit.

FIGS. 11A to 11C are pattern diagrams showing a change of each credit.

FIGS. 12A to 12D are pattern diagrams showing a change of each credit.

FIGS. 14A to 14D are pattern diagrams showing a change of each credit.

FIG. 18 is a view exemplary showing information stored on a read advance information storing section.

FIG. 19 is a view exemplary showing information stored on a used amount storing section.

DESCRIPTION OF EXEMPLARY EMBODIMENTS

The embodiments of the invention will now be described based on the preferred embodiments, which do not intend to limit the scope of the present invention, but just exemplify the invention. All of the features and the combinations thereof described in the embodiment are not necessarily essential to the invention.

Figure 1:
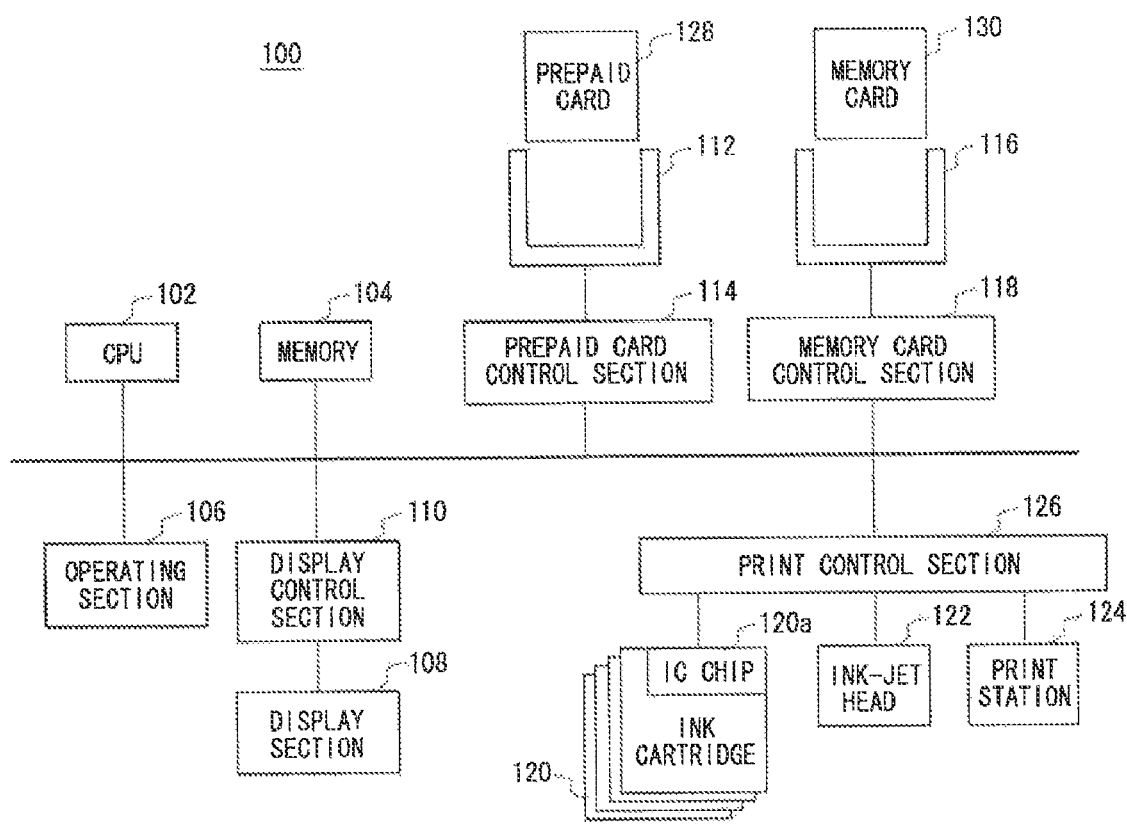
FIG. 1 is a block diagram showing a configuration of a printer as an embodiment of the invention.

FIG. 1 is a block diagram showing a configuration of a printer as an embodiment of the invention. The printer 100 of the present embodiment is an ink-jet compound machine, and as shown in FIG. 1 mainly includes a CPU 102 that controls each component and performs various kinds of processes according to a program such as firmware, a memory 104 that stores the above program and stores various kinds of data, an operating section 106 that consists of control panels and accepts various kinds of instructions from a user, a display section 108 that consists of liquid crystal panels and inform a user of various kinds of information, a display control section 110 that controls the display section 108, a prepaid card mounting section 112 that mounts a prepaid card 128 inserted in a prepaid card slot (not shown), a prepaid card control section 114 that reads and writes a credit stored on the prepaid card 128, a memory card connecting section 116 that connects a memory card 130 inserted in a memory card slot (not shown), a memory card control section 118 that reads and writes image data or the like recorded on the memory card 130, four ink cartridges 120 that are filled with ink for cyan, magenta, yellow, and black, an ink-jet head 122 on which these ink cartridges are mount and has a plurality of nozzles for ink colors, a print station 124 that perform a movement of the ink-jet head 122, form feed, and so on, and a print control section 126 that controls the ink-jet head 122 and the print station 124 and reads and writes information such as a remaining amount of ink from and in an IC chip 120a provided inside each of the ink cartridges 120. In addition, the printer 100 includes a scanner section for reading a manuscript or the like, a scanner control section, a USB device connector for connecting a computer or the like via USB, a USB device controller, a USB host connector for connecting a digital camera or the like via USB, a USB host controller, an IrDA receiving section for receiving an infrared signal an IrDA controller, and so on, which are omitted in FIG. 1.

According to the present embodiment, the printer 100 has the prepaid card 128 inserted therein, counts the numbers of head shots in the ink-jet head 122 during printing, and withdraws a credit according to the obtained number of head shots from the prepaid card 128. In addition, in the embodiment, the ink-jet head 122 corresponds to a print section in claims, the prepaid card control section 114 and the prepaid card mounting section 112 correspond to a prepaid card accessing section in claims, the print control section 126 corresponds to a print control section in claims, and the CPU 102 corresponds to a control section in claims.

Figure 2:
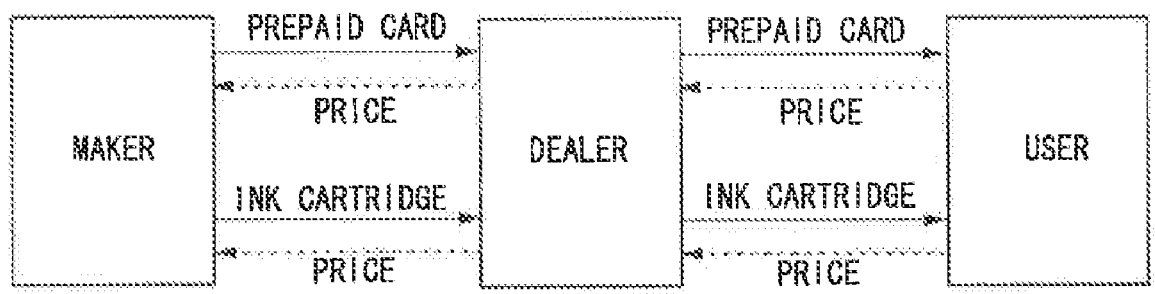
FIG. 2 is an explanation diagram explaining a sales channel of a prepaid card and an ink cartridge used in a printer shown in FIG. 1.

As assumption of the present embodiment, the ink cartridge 120 that is consumables is sold from a maker to a user via a dealer as shown in FIG. 2. Moreover, the prepaid card 128 used in the printer 100 is also sold through the same sales channel, i.e., from a maker to a user via a dealer. Therefore, a user purchases the ink cartridge 120 from a dealer when ink has been completely consumed, and purchases the prepaid card 128 required for printing from a dealer prior to printing. The purchased prepaid card 128 additionally stores an encoded credit with a given quantity. The prepaid card 128 stores authentication information showing that the card is a regular prepaid card. Moreover, the prepaid card 128 may store model information showing the type of an applicable compound machine or a printer.

Then, it will be explained about an operation of the printer 100 of the present embodiment. For example, it will be described about the case that image data taken by a digital camera or the like and recorded on the memory card 130 are printed.

First, when a user inserts the memory card 130 on which image data are recorded into a memory card slot in the printer 100, the memory card 130 is connected to a memory card connecting section 116. The CPU 102 reads the image data recorded on the memory card 130 via the memory card control section 118 and the memory card connecting section 116 and generates a preview image from these image data, in order to make the display section 108 display the preview image via the display control section 110. The user operates the operating section 106 to select image data to be printed while looking at the preview image displayed on the display section 108, and then an accounting and printing process shown in FIGS. 3 and 4 is started when the user instructs the printer to print the image data.

Figure 3:
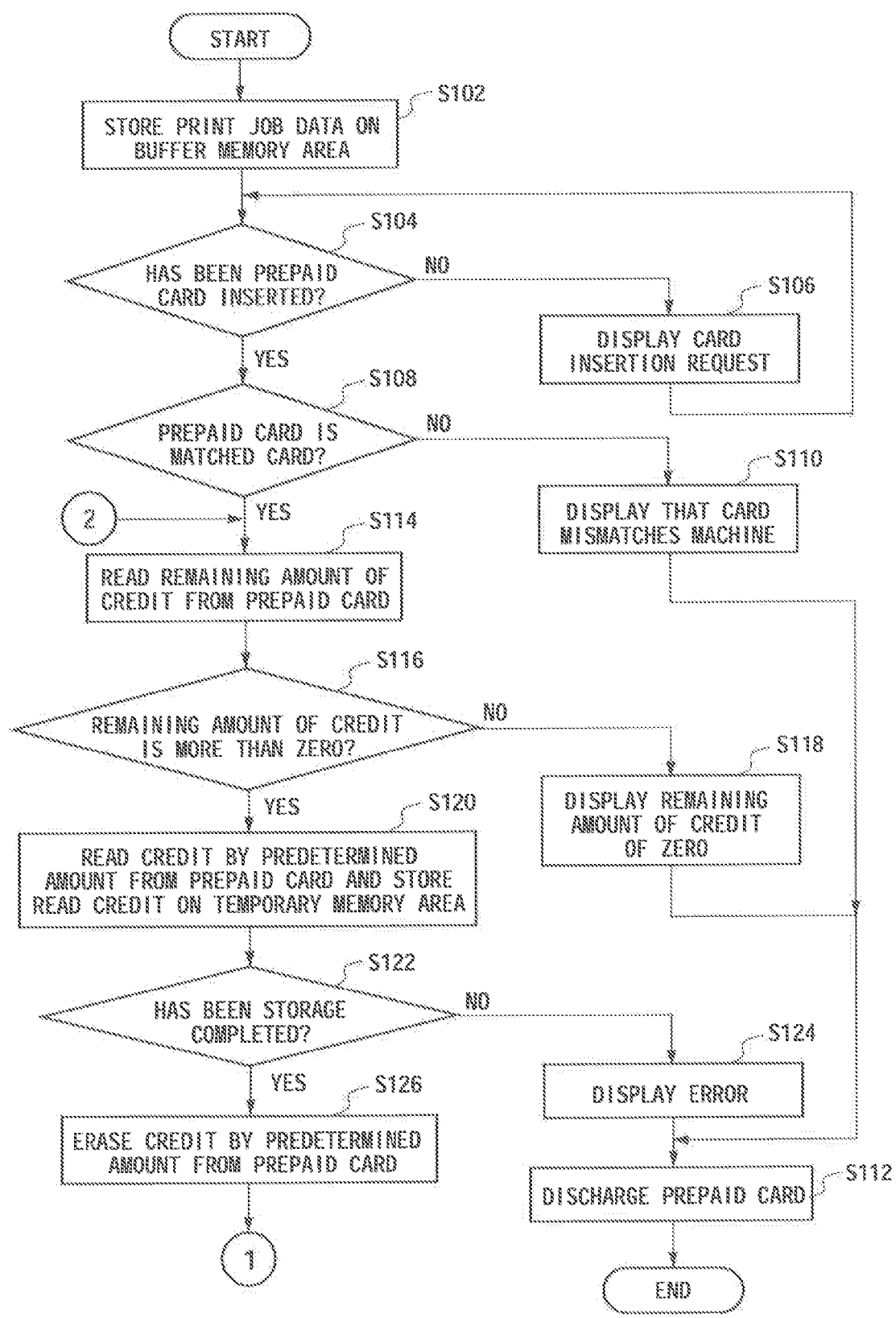
FIG. 3 is a flowchart showing a flow of accounting and printing process executed in a printer shown in FIG. 1.
Figure 4:
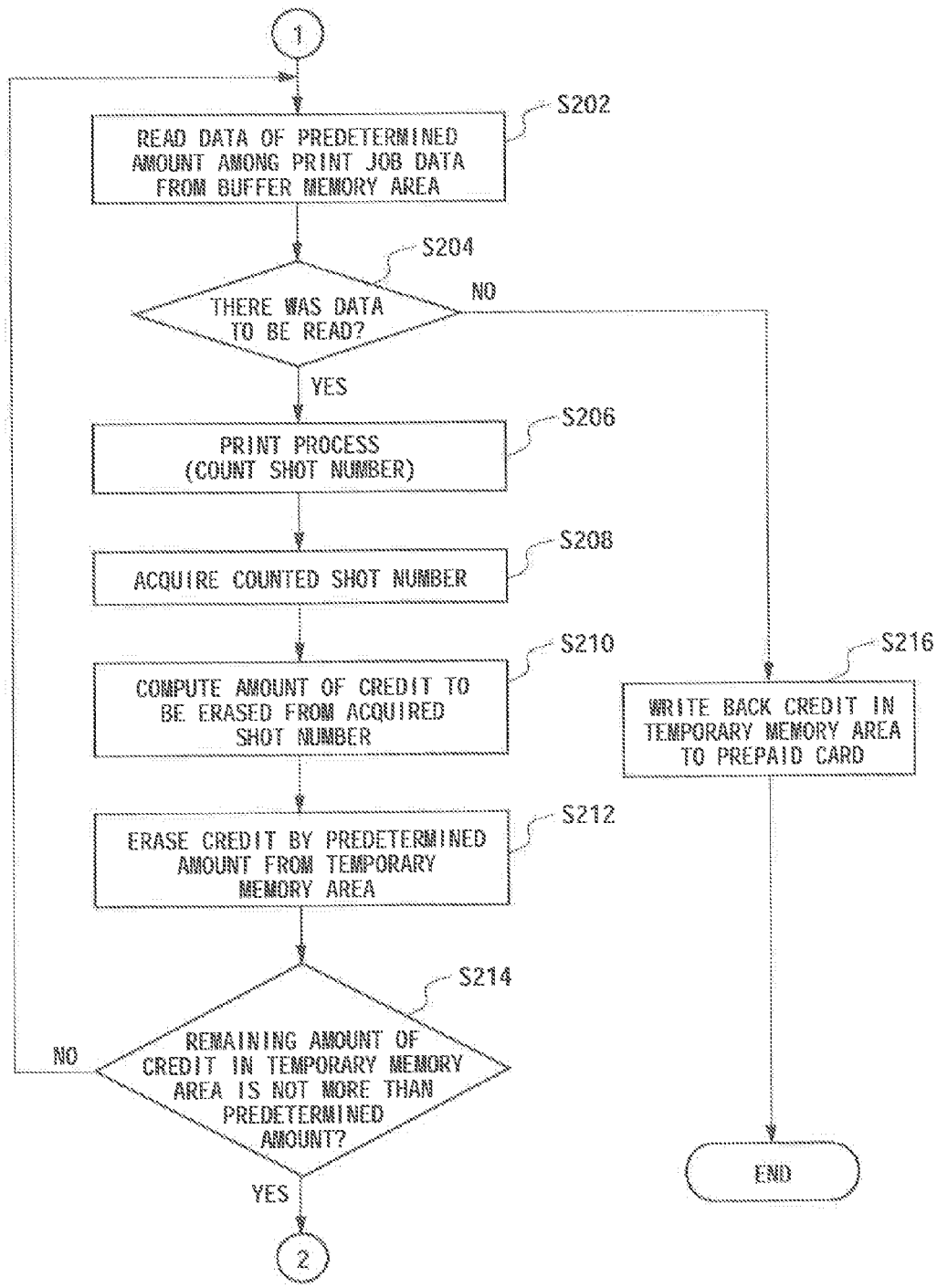
FIG. 4 is a flowchart showing a flow of accounting and printing process executed in a printer shown in FIG. 1.

FIGS. 3 and 4 are flowcharts showing a flow of accounting and printing process executed in the printer 100 shown in FIG. 1. If a process shown in FIG. 3 is started, the CPU 102 first stores image data to be printed on a buffer memory area in the memory 104, which are acquired from the memory card 130 via the memory card connecting section 116 and the memory card control section 118 (step S102).

Next, the CPU 102 detects whether the prepaid card 128 is inserted into a prepaid card slot the prepaid card control section 114, and makes the display section 108 display a message such as "Please, insert the prepaid card!" via the display control section 110 when the card is not inserted (step S106).

When the prepaid card has been already inserted or when the prepaid card has been inserted by a user based on a card insert request, the CPU 102 accesses the prepaid card 128 via the prepaid card control section 114 and the prepaid card mounting section 112, reads model information and authentication information from the prepaid card 128, and decides whether the prepaid card 128 is a prepaid card compatible with the printer 100 based on these information (step S108).

As a result, when the prepaid card does not match the printer, the CPU 102 makes the display section 108 display a message such as "This prepaid card does not match this compound machine" (step S110), discharges the prepaid card 128 by the prepaid card control section 114 after that (step S112), and terminates a series of processes.

As a decision result in step S108, when the prepaid card matches the printer, the CPU 102 accesses the prepaid card 128 via the prepaid card control section 114 and the prepaid card mounting section 112, and reads a remaining amount of the stored credit from the prepaid card 128 (step S114). In addition, since the stored credit information is encoded, the CPU 102 decodes the read credit information in each case. Then, the CPU 102 decides whether a remaining amount of the read credit is larger than zero (step S116), makes the display section 108 display a message such as "This prepaid card does not have a remaining amount of credit," if the remaining amount is zero (step S118), discharges the prepaid card 128 by the prepaid card control section 114 after that (step S112), and then terminates a series of processes.

If the remaining amount of credit is larger than zero, the CPU 102 accesses the prepaid card 128 via the prepaid card control section 114 and the prepaid card mounting section 112 once more reads the stored credit by a predetermined amount from the prepaid card 128, and stores the read credit on a temporary memory area in the memory 104 (step S120). Here, a predetermined amount means an amount of credit corresponding to an amount of money to be imposed on a user when performing print for one raster. In addition, when the credit stored on the prepaid card 128 does not reach the predetermined amount during reading, all credits left are read.

Next, the CPU 102 checks whether the read credit has been normally stored on the temporary memory area (step S122), makes the display section 108 display an error message when the storage is not normally completed (step S124), discharges the prepaid card 128 by the prepaid card control section 114 after that (step S112), and terminates a series of processes.

As a result of check in step S122, if the storage of credit is normally completed, the CPU 102 accesses the prepaid card 128 via the prepaid card control section 114 and the prepaid card mounting section 112, and erases a credit from the prepaid card 128 by a predetermined amount (step S126). As a result, the remaining amount of credit within the prepaid card 128 is reduced by the predetermined amount.

Next, in FIG. 4, the CPU 102 reads a predetermined-amount data among the stored print job data from a buffer memory area in the memory 104 (step S202). Here, a predetermined amount means a data amount for one raster. In addition, when data left without being read among the stored print job data do not reach a predetermined amount, all data left are read.

Then, the CPU 102 decides whether there are data to be read (step S204), and performs a printing process on the read data when there are data to be read (step S206). Specifically, the CPU 102 performs an image processing such as color conversion, half-tone, and picture quality correction on the read data, and then the print control section 126 controls the ink-jet head 122 and the print station 124 based on data after the process to print all image on printing paper. At this time, the print control section 126 counts the number of head shots in the ink-jet head 122 based on a driving signal to be supplied to the ink-jet head 122. The number of head shots is a value counting the number of shots for all nozzles of the ink-jet head 122. In this manner, in the present embodiment, since the number of head shots in the ink-jet head 122 is counted based on the driving signal to be supplied to the ink-jet head 122, it is possible to measure a value related to an amount of printing by which the printer 100 really prints data.

If printing has been completed by the read data amount, the CPU 102 acquires the counted number of head shots from the print control section 126 (step S208), and computes an amount of credit to be erased from the acquired number of head shots (step S210). Specifically, an amount of credit corresponding to an amount of money to be imposed on a user is previously set for a unit head shot number, and calculates an amount of credit based on the set value. In addition, when performing the setting, rounding number is performed, for example the number of head shots of 10000 shots is used as one credit. Since the number of head shots becomes an extremely large value, the number of digits of a remaining amount of credit stored on the prepaid card becomes too large when one shot corresponds to one credit.

Next, the CPU 102 erases a credit by the computed amount from the temporary memory area in the memory 104 (step S212). As a result, a remaining amount of credit within the temporary memory area is reduced by the computed amount.

Subsequently, the CPU 102 compares a remaining amount of credit stored on the temporary memory area in the memory 104 and the above-described predetermined amount (an amount of credit corresponding to an amount of money to be imposed on a user when performing printing for one raster), returns the process to step S202 if the remaining amount of credit exceeds the predetermined amount, reads data of the next predetermined amount among the stored print job data from the buffer memory area in the memory 104, and then repeats the processes similar to those described above. On the contrary, when a remaining amount of credit is not more than the predetermined amount, the CPU 102 returns the process to step S114 in FIG. 3, accesses the prepaid card 128 via the prepaid card control section 114 and the prepaid card mounting section 112, reads the stored remaining amount of credit from the prepaid card 128 once more, and then repeats operations similar to those described above.

In this way, the CPU 102 prints images while reading the print job data from the buffer memory area in the memory 104 by the predetermined amount, and withdraws a credit from the prepaid card 128 according to a print amount (i.e., the number of head shots).

After that, as a decision result in S204, since all the print job data stored on the buffer memory area have been read, when there are not the read data, the CPU 102 reads the stored all credits from the temporary memory area in the memory 104, accesses the prepaid card 128 via the prepaid card control section 114 and the prepaid card mounting section 112, writes back read credit to the prepaid card 128 (step S216), and terminates a series of processes.

As described above, a credit according to a print amount has been withdrawn from the prepaid card 128 for image printing on the basis of print job data.

As described above, accounting related to print can be performed by a sale of the prepaid card 128 irrespective of a sale of consumables such as the ink cartridge 120, by introducing the printer 100 of the present embodiment. Therefore, consumables can be circulated at a price with a few burdens. Moreover, since a dealer can obtain profits by a sale of the prepaid card even if profits are not obtained by circulation of consumables, circulation of consumables can be promoted and the dealer can also obtain profits. Furthermore, since a conventional circulation system may not be modified, a dealer and a distributor do not have a drawback or a burden.

Moreover, since the collection of a fee related to print from a user is performed before printing by performing accounting related to print by means of a prepaid card, there is not required an additional management system such as a structure for collecting a fee and a structure for returning a profit to a dealer and there is not required a cost for constructing, managing, and operating a system.

Furthermore, since accounting related to print is performed by means of prepaid card, when a printer is out of order in a state that a remaining amount of ink remains in an ink cartridge and thus the printer is exchanged into another printer, a user does not feel disadvantage when the ink cartridge is supplied at a sufficiently cheap price even though the ink cartridge used in the original printer cannot be used in a new printer.

In addition, the present invention is not limited to the above-described example or embodiment and can be realized in various kinds of aspects in the range without departing from the spirit.

In the above-described embodiment, although the printer 100 is an ink-jet compound machine the printer may be an ink-jet printer or may be a laser compound machine or a laser printer that uses toner instead of ink.

Figure 5:
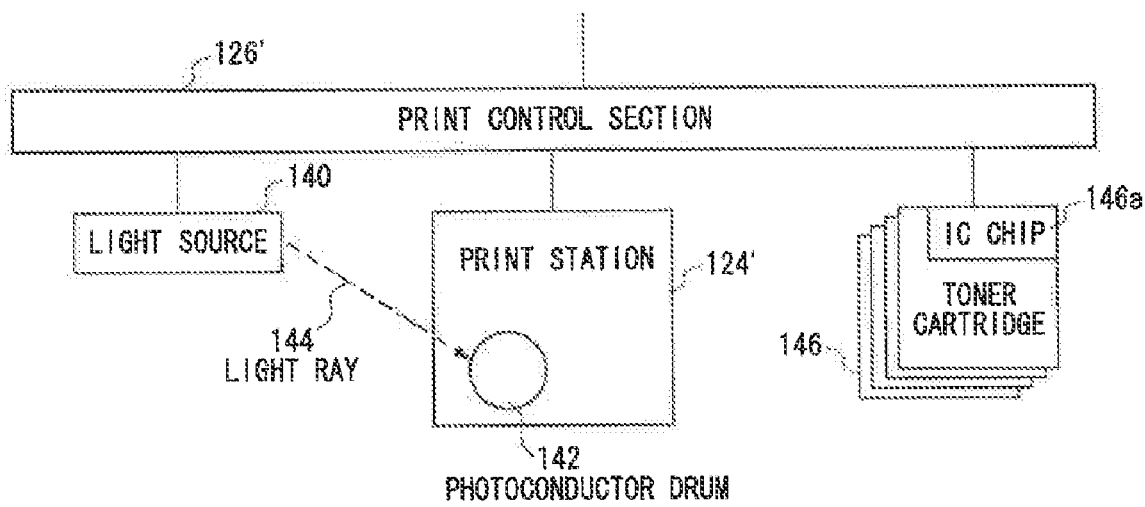
FIG. 5 is a block diagram showing a configuration of a principal part when a printer is a laser compound machine as an alternative example of the present invention.

FIG. 5 is a bock diagram showing a configuration of a principal part when a printer is a laser compound machine as an alternative example of the present invention. Since a laser compound machine is different from an ink-jet compound machine in view of a printing method, components related to real printing operations are different from one another. In other words, as shown in FIG. 5, the printer according to this alternative example includes a light source 140 that consists of a semiconductor laser or a light-emitting diode and irradiates light ray, a print station 124' that includes a photoconductor drum 142 for receiving irradiated light ray 144 and electrifying itself to attach toner or the like thereon and performs the scan of irradiated light ray 144, the rotational driving of the photoconductor drum 142, pressure bonding of printing paper to the photoconductor drum 142, and so on, four toner cartridges 146 that are filled with toners with cyan, magenta yellow, and black, and a print control section 126' that controls the light source 140 and the print station 124' and also reads and writes information such as a remaining amount of toner from and in an IC chip 146a provided inside each of the toner cartridges 146. A configuration excepting components related to real printing operations is similar to a configuration shown in FIG. 1. In addition, in this alternative example, the light source 140 or the like corresponds to a print section in claims, and the photoconductor drum 142 corresponds to a photo conductor.

In this alternative example, the print station 124' accumulates irradiation times of the light ray 144 emitted from the light source 140 based on a driving signal supplied to the light source 140 in place of counting the number of head shots. In this way, it is possible to measure a value related to an amount of print really performed in the printer, In addition, in this case, the CPU 120 acquires the accumulated irradiation time from the print control section 126' in step S208 shown in FIG. 4, and computes an amount of credit to be erased from the acquired irradiation time in step S210.

Moreover, in place of accumulating irradiation times of such a light ray, an amount of irradiation capable of being converted into the number of print pages may be counted to measure a value related to a print amount.

In the above-described embodiment, although an operation except normal printing has not been described, the number of head shots that is a standard of withdrawal of credit is the number of head shots generated during normal printing, and the number of head shots generated besides normal printing such as flushing, cleaning, nozzle check printing, and Bi-D correction printing is not included in the number of head shots that is a standard of withdrawal of credit.

In the above-described embodiment, although the IC chip 120a provided inside each of the ink cartridges 120 has not been described, by means of information for a remaining amount of ink stored on the IC chips 120a, the printer may be operated not to be printed even if a credit remains in the prepaid card 128 when the ink end of the ink cartridge 120 is close, on the contrary, the printer may be operated not to be printed even if ink sufficiently remains in the ink cartridge 120 when a credit does not particularly remain in the prepaid card 128.

In the above-described embodiment, the printer prints an image while reading print job data by a predetermined amount (i.e., a data amount of one raster) from the buffer memory area in the memory 104, and after reading and printing a predetermined amount, when a remaining amount of credit within the prepaid card 128 disappears, the printer displays no remaining amount of credit (sep S118) and discharges the prepaid card 128 (step S124) to stop print even if it is in the middle of printing. However, in this manner, when the printing is stopped in order to exchange the prepaid card in the middle of printing a certain page, since a print quality may degrade due to color unevenness on the print page or bad printing, a certain page in the middle of printing may be printed up to the completion of printing even though a remaining amount of credit within the prepaid card 128 disappears in the of printing the page.

In the above-described embodiment, although a data amount of one raster is read as a predetermined amount when reading print job data from the buffer memory area in the memory 104 in step S202, the present invention is limited to this and may read a data amount for one page. Moreover, when reading or erasing a credit from the prepaid card 128 by a predetermined amount in step S120 or S126, although the predetermined amount was treated as an amount of credit corresponding to an amount of money to be imposed when performing print for one raster, the predetermined amount may be treated as an amount of credit corresponding to an amount of money to be imposed when performing print for one page. In addition, when predetermined amount when reading print job data from the buffer memory area in the memory 104 is a data amount for one page, it is preferable that the predetermined amounts when reading and erasing a credit from the prepaid card 128 are identical with each other as one page as an amount of credit corresponding to an amount of money to be imposed.

In the above-described embodiment, although detailed information about the prepaid card 128 has not been described, the prepaid card 128 includes the following various kinds of media: a magnetic card; an IC card; a memory card; an optical disc; USB memory (in this case, it is connected to an USB host connector); and a radio tag (in this case, an electric connector becomes unnecessary for non-contact). Moreover, although a prepaid card generally means a price advance payment card or a fee advance payment card, the prepaid card in the present specification further includes rechargeable digital money card or the like (e.g., SUICA or Edy (registered trademark)).

In addition, it is not necessary that the radio tag is inserted into, mounted on, or connected to the printer 100 like other media because a radio tag is non-contact type, and thus the radio tag may be arranged in a range capable of being accessed from the printer 100, that is, a range of access of radio.

Moreover, it is desirable that the prepaid card 128 is general purpose for a compound machine or a printer manufactured in the same maker. The reason is that a credit is not wasted if the prepaid card 128 can be used for other models.

Moreover, as the prepaid card 128 may be a disposable card, or may be a reusable card of which a credit can be charged in a dedicated terminal installed in a store of a dealer.

Moreover, When charging a credit in a dedicated terminal, discount may be performed if the total of charge exceeds a certain amount of money. The discount service includes the following: proving a credit more than the charged amount of money by 10%; issuing a discount coupon for an ink cartridge; and issuing a discount coupon for a compound machine main body or a printer main body.

In the above-described embodiment, although the descriptions have been performed about the case that an image recorded on the memory card 130 is printed as an example, the modes executed in the printer 100 of a compound machine include the following modes: when printing an image stored on a computer by way of USB; when printing an image recorded on a portable telephone with a camera (in this case, IrDA or Bluetooth is used as a communications means, and an adapter of Bluetooth is connected to a USB host connector in a compound machine); and when performing copy (in other words, when printing an image read by a scanner section).

In the above-described embodiment, user interfaces displayed on the display section 108 have not been described in detail, there may be provided a menu by which a remaining amount of credit stored on the prepaid card 128 can be confirmed. Moreover, a remaining amount of credit may be displayed on the prepaid card 128 at a timing (for example, when inserting the prepaid card 128 or turning on a power source of the printer 100 at it is inserted) recognizing the prepaid card 128. Moreover, when the prepaid card 128 is extracted during printing, the printer may stop the print, discharge the printing paper, and display a message "The prepaid card has been extracted, and stop print!" on the display section 108 for several seconds. Furthermore, when the prepaid card 128 is not inserted, the printer may display an icon showing that the prepaid card 128 is not inserted on a part of the display section 108, for example, on an area on which a remaining amount of ink is displayed. In that case, the printer may display the icon and the display of a reimagining amount of ink side-by-side, or may display only the icon in place of the display of a remaining amount of ink.

In the above-described embodiment, although the printer 100 includes therein the prepaid card mounting section 112 and the prepaid card control section 114, these sections may be connected to the printer via an USB host connector as a prepaid card reader and writer provided separately.

In the above-described embodiment, although the ink cartridge 120 has not been described in detail, it is referable that the ink cartridge 120 used in the printer 100 of the present embodiment cannot be used in a compound machine or a printer that does not correspond to the prepaid card 128. Therefore, there is considered a method by which an ink cartridge cannot be physically mounted on a compound machine not corresponding to a prepaid card by changing the shape of a mounting section of the ink cartridge 120 used in the printer 100 of the present embodiment, or a method by which it is decided that an ink cartridge is illegal using information stored on the IC chip 120a provided inside the ink cartridge 120 when the ink cartridge 120 used in the printer 100 of the present embodiment is mounted on a compound machine not corresponding to the prepaid card.

Figure 6:
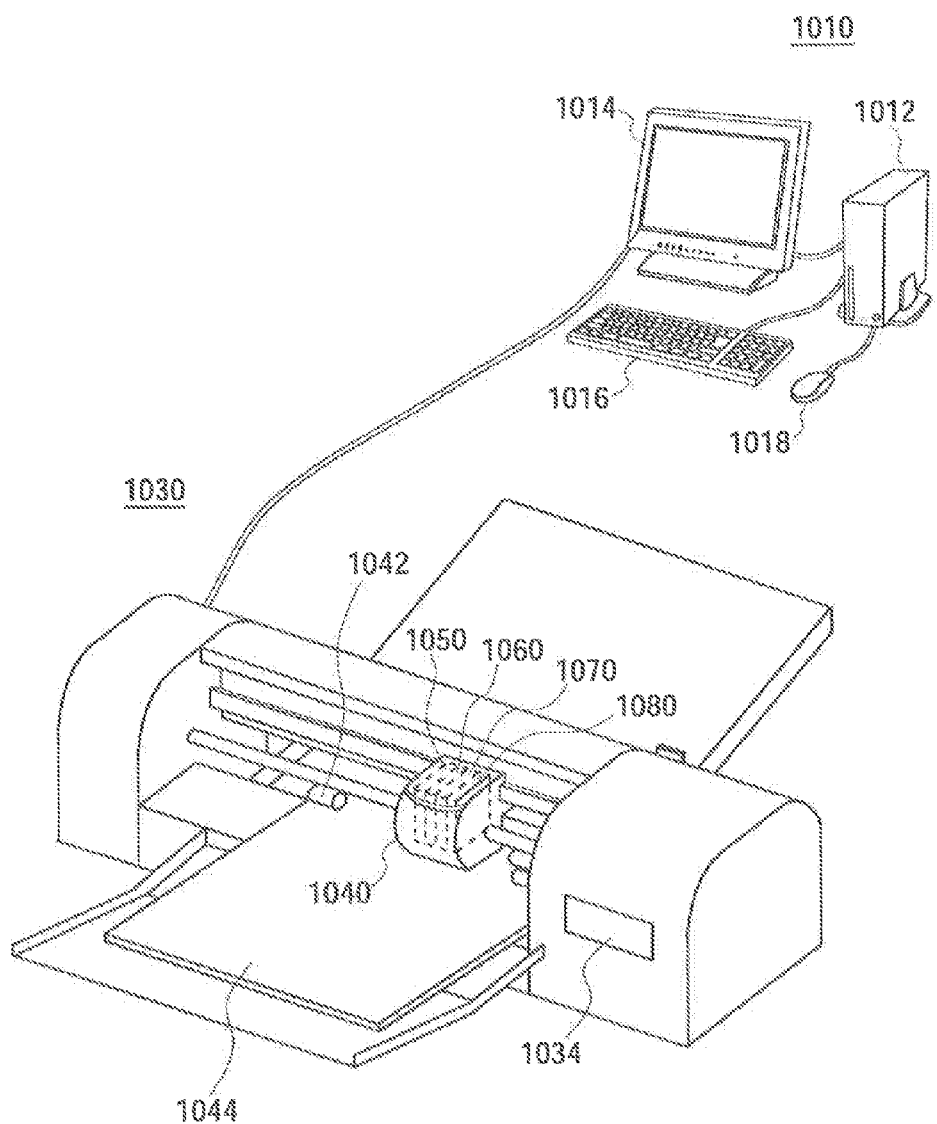
FIG. 6 is a view exemplary showing a printer.

FIG. 6 is a view exemplary showing a printer 1030 as another embodiment of the present invention. The printer 1030 includes a carrying portion 1042 that carries a medium 1044, a print head 1040 that discharges a color material to the medium while reciprocating over the medium 1044 carried by the carrying portion 1042, and a display 1034 such as a liquid crystal that displays circumstances of print. Moreover, the printer 1030 detachably accommodates cartridges 1050, 1060, 1070 and 1080 for accommodating ink. For example, the cartridges 1050, 1060, 1070, and 1080 accommodate ink with black, cyan, magenta, and yellow. Further, the printer 1030 is connected to a personal computer 1010. The personal computer 1010 includes a main body 1012, a display 1014, a keyboard 1016, and a mouse 1018.

Figure 7:
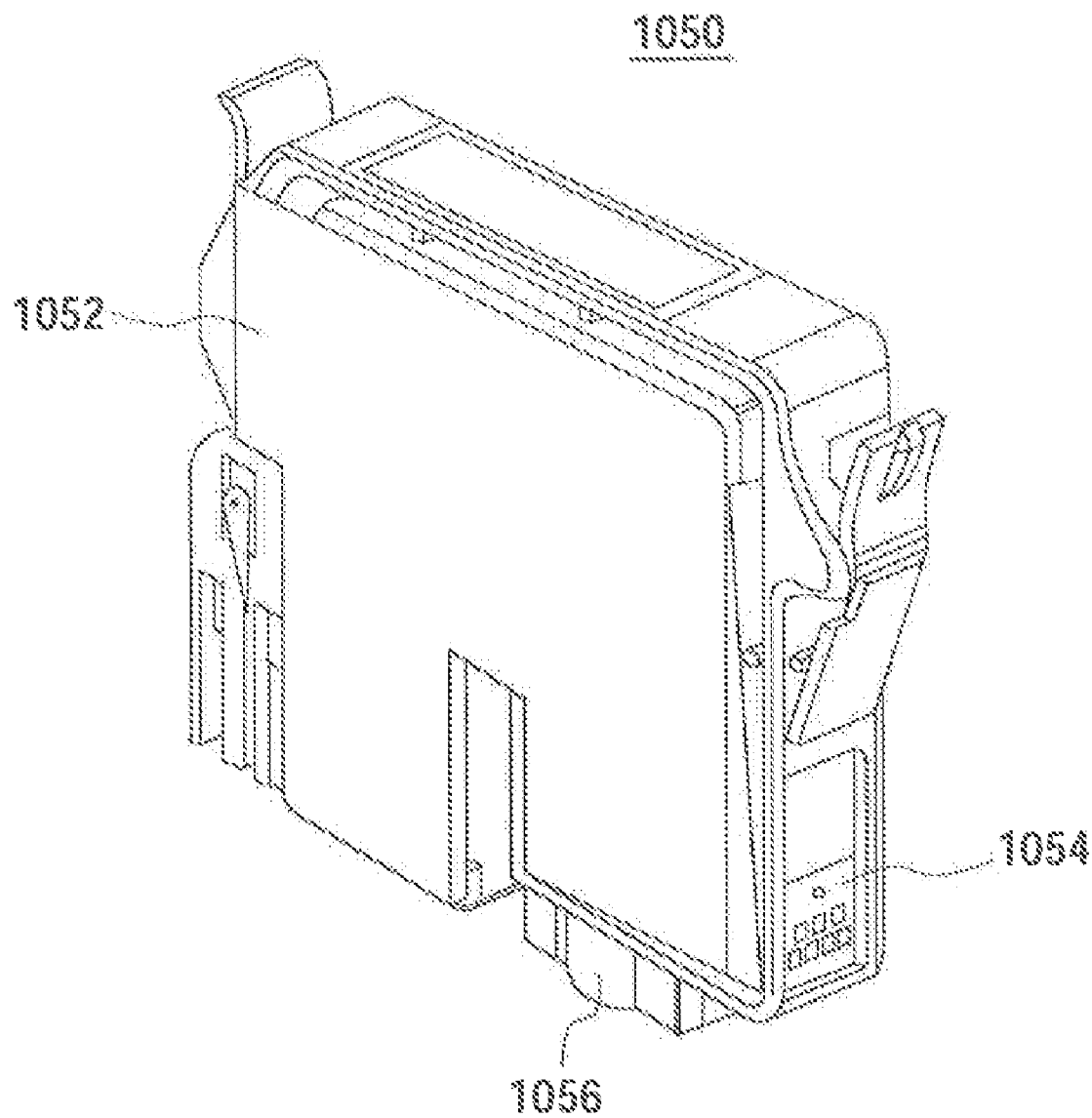
FIG. 7 is a perspective view showing cartridge.

FIG. 7 is a perspective view showing the cartridge 1050. The cartridge 1050 includes a cartridge main body 1052 for accommodating ink, an ink supply port 1056 for supplying ink to the printer 1030, an advance information holder 1054 for storing advance information. The advance information holder 1054 is an IC chip including a contact terminal that is electrically contacted with a reading and writing section at the printer 1030 side and a memory that is electrically connected to this contact terminal and stores information.

The advance information holder 1054 stores a credit (hereinafter, a credit stored on the advance information holder 1054 is referred to as an "IC credit") that is advance information. The advance information holder 1054 stores an IC credit capable of being used in the present obtained by subtracting the accumulation of IC credit consumed by the use of the printer 1030 from an IC credit according to the amount of money previously paid by user as a use fee for the printer 1030. Moreover, the advance information holder 1054 may store authentication data or the like showing justice of an IC credit in addition to the IC credit. Moreover, the advance information holder 1054 may further store information related to colors of ink in addition to an IC credit. Moreover, the advance information holder 1054 may be detachably mounted to the cartridge main body 1052. In addition, the cartridges 1060, 1070, and 1080 not shown respectively include a cartridge main body for accommodating ink and an ink supply port for supplying ink to the printer 1030.

Figure 8:
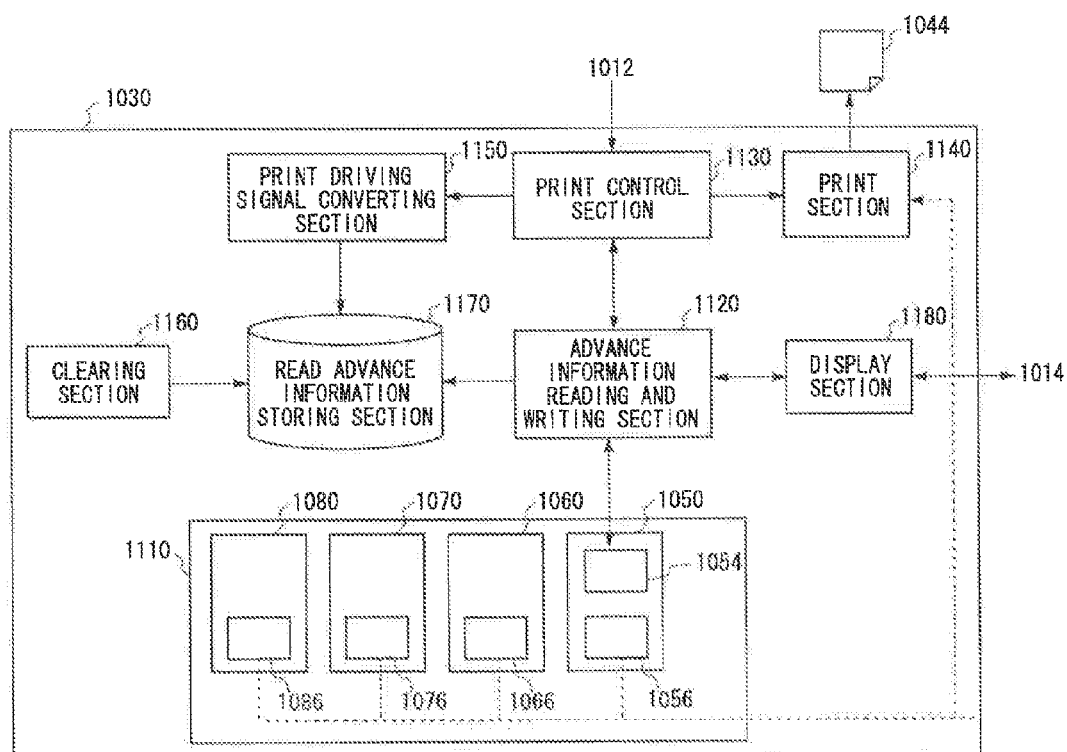
FIG. 8 is a block diagram exemplary showing a printer.

FIG. 8 is a block diagram exemplary showing the printer 1030. The printer 1030 includes a cartridge accommodating section 1110, an advance information reading and writing section 1120, a print control section 1130, a print section 1140, a print driving signal converting section 1150, a clearing section 116, a read advance information storing section 1170, and a display section 1180.

The cartridge accommodating section 1110 detachably accommodates the cartridges 1050, 1060, 1070, and 1080. Moreover the cartridge accommodating section 1110 detects attachment and detachment of the cartridges 1050, 1060, 1070, and 1080.

The advance information reading and writing section 1120 reads and writes an IC credit from and in the advance information holder 1054 in the cartridge 1050 accommodated in the cartridge accommodating section 1110. Here, the advance information reading and writing section 1120 reads an IC credit corresponding to an amount of print of a page unit as a unit of reading an IC credit from the advance information holder 1054. Moreover, the advance information reading and writing section 1120 may read an IC credit corresponding to the number of discharges performed for a round of the print head 1040 in place of a reading unit of a page unit. Furthermore, even in case of a page unit and a round unit, a constant value may be read as a reading unit, or an expected discharge number required for this print may acquired or computed every page and round movement, and a reading unit may be set and read every page and round movement based on the expected discharge number.

The read advance information storing section 1170 stores a read credit read from the advance information holder 1054, a used credit consumed by the use of the printer 1030, and an after-cleaning credit obtained by subtracting the used credit from the read credit.

The print control section 1130 accepts a print job from the personal computer 1010, and outputs a print driving signal controlling print. For example, the print driving signal includes a signal related to a head shot controlling the print head 1040. The print section 1140 has the above print head 1040 and the carrying portion 1042, and carries the medium 1044 by the carrying portion 1042 based on the print driving signal output from the print control section 1130 and discharges ink from the cartridges 1050, 1060, 1070, and 1080 to perform print while reciprocating the print 1040 over the medium 1044. In this case, the print head 1040 may discharge ink on both paths of coming and going paths, or may discharge ink on one path of coming and going paths.

The print driving signal converting section 1150 converts the print driving signal into accounting information. In other words, the print driving signal converting section 1150 computes a used credit as accounting information based on the print driving signal. For example, the print driving signal converting section 1150 previously stores conversion information that 10000 shots correspond to one credit.

The clearing section 1160 clears the read credit stored on the read advance information storing section 1170 by the used credit converted by the print driving signal converting section 1150. The display section 1180 displays error messages on the display 1014.

Figure 9:
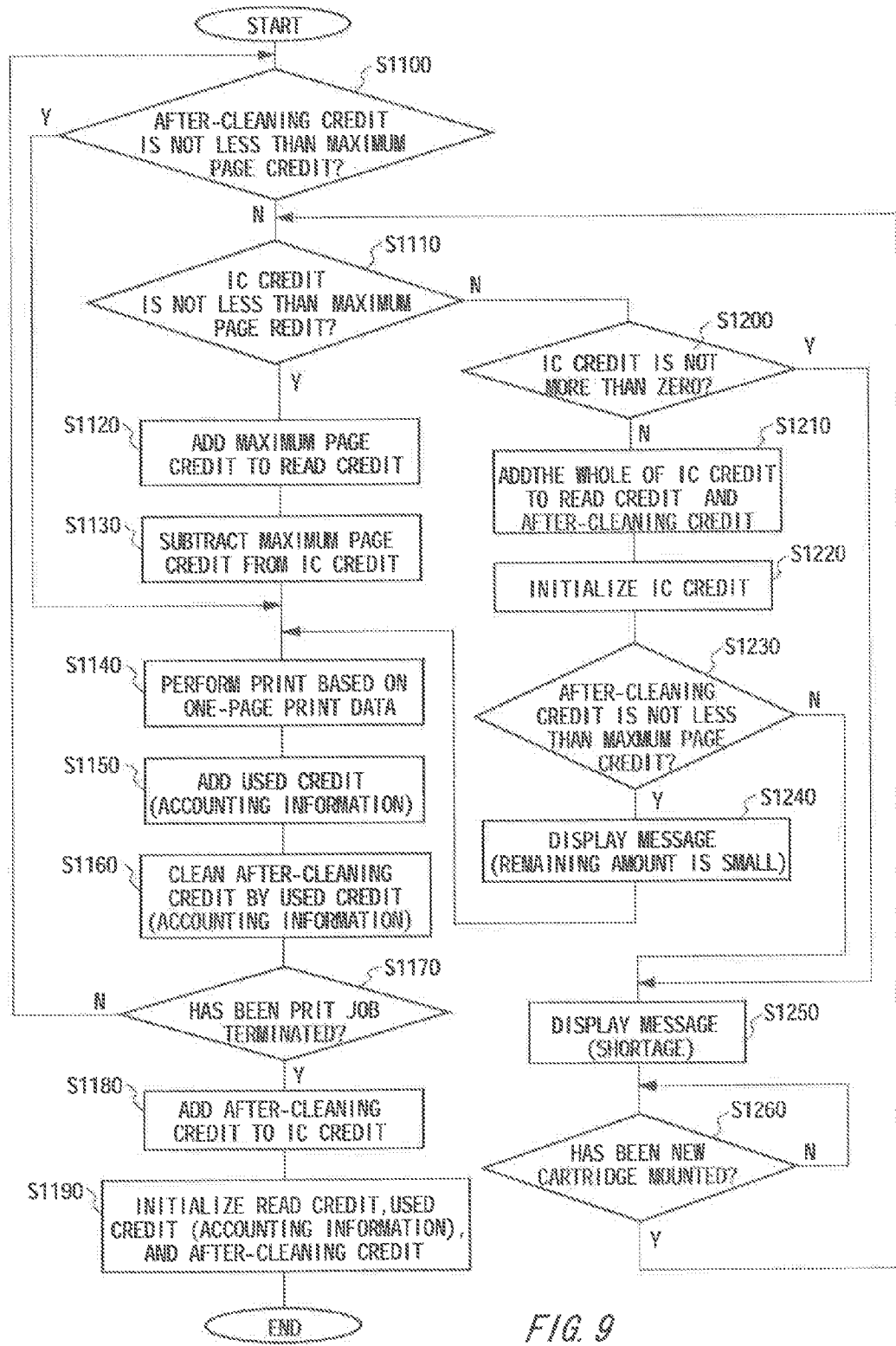
FIG. 9 is a flowchart exemplary showing an operation of a printer.

FIG. 9 is a flowchart exemplary showing an operation of the printer 1030. FIGS. 10 and 11 are pattern diagrams showing a change of each credit. The flowchart shown in FIG. 9 is started in response to the fact that the print control section 1130 in the printer 1030 receives a print job from the personal computer 1010. In addition, at a start time of the present flowchart, the cartridge accommodating section 1110 accommodates the cartridges 1050, 1060, 1070, and 1080. Moreover in the start time of the present flowchart, it is assumed that an IC credit stored on the advance information holder 1054 and a read credit, a used credit, and an after-cleaning credit stored on the read advance information storing section 170 respectively correspond to an IC credit "27", a read credit "0 (an initial value)", a used credit "0 (an initial value)", and an after-leaning credit "0 (an initial value)" as shown in FIG. 10A. Moreover, it is assumed that the print control section 1130 receives a print job printing five pages totally.

The print control section 1130 reads the after-cleaning credit from the read advance information storing section 1170 via the advance information reading and writing section 1120, and judges whether the read after-cleaning credit is not less than a maximum page credit (S1100). In addition, the maximum page credit is a reading unit for an IC credit read by the advance information reading and writing section 1120, and means an IC credit corresponding to an amount of print of a page unit. The maximum page credit may be a credit predetermined as a print amount, for example when discharging ink on the whole of one page to perform print. Hereinafter, it is assumed that the maximum page credit is "10". In an example shown in FIG. 10A, the print control section 1130 reads an after-cleaning credit "0", and judges that the after-cleaning credit is less than the maximum page credit "10".

In step S1100, when the print control section 1130 judges that the after-cleaning credit stored on the advance information holder 1054 is less than the maximum page credit (S1100: No), the print control section 1130 judges whether the IC credit is not less than the maximum page credit (S1110). In an example shown in FIG. 10A, the print control section 1130 judges that the IC credit "27" is not less than the maximum page credit "10".

In step S1110, when it is judged that the IC credit is not less than the maximum page credit (S1110: Yes), the print control section 1130 adds the maximum page credit to the read credit via the advance information reading and writing section 1120 (S1120). Moreover, the print control section 1130 subtracts the maximum page credit from the IC credit via the advance information reading and writing section 1120 (S1130). In other words, when it is judged that the maximum page credit can be moved from the IC credit to the read credit (S1110: Yes), the print control section 1130 moves the maximum page credit from the IC credit to the read credit (S1120 and S1130). In an example shown in FIG. 10A, the print control section 1130 judges that the maximum page credit "10" can be moved from the IC credit "27" to the read credit "0", and moves the maximum page credit "10" from the IC credit "27" to the read credit, so as to go to a state shown in FIG. 10B.

The print control section 1130 outputs a first-page print driving signal to the print section 1140 based on the print job. The print section 1140 moves the print head 1040 based on the print driving signal output from the print control section 1130, and discharges ink from the cartridges 1050, 1060, 1070, and 1080, in order to perform print (S1140).

The print driving signal converting section 1150 adds a used credit as accounting information for the first-page print to the read advance information storing section 1170 (S1150). Specifically, the print driving signal converting section 1150 first acquires signal related to a head shot required for the first-page print output from the print control section 1130 in step S1140, in order to compute the number of head shots required for the first-page print. The print driving signal converting section 1150 converts the computed number of head shots into the used credit for the first page, and adds the converted credit to the used credit stored on the read advance information storing section 1170. Furthermore, the print driving signal converting section 1150 informs the clearing section 1160 of the effect that the used credit is added to the read advance information storing section 1170. The informed clearing section 1160 clears the read credit by the used credit (S1160). In an example shown in FIG. 10C, the clearing section 1160 computes the used credit "3", and computes the after-cleaning credit "7" as a difference between the read credit "10" and the used credit "3".

The print control section 1130 judges whether the print for print job has been terminated (S1170). In step S1170, when it is judged that the print for print job has not been terminated (S1170: No), the print control section 1130 returns the process to step S1100. FIG. 10D shows an IC credit "7", a read credit "20", a used credit "9", and an after-cleaning credit "11" at the termination time in step S1160 for the second page (the used credit "6").

On the other hand, in step S1100, when it is judged that the after-cleaning credit is not less than the maximum page credit (S1100: Yes), the print control section 1130 skips steps S1110, S1120, and S1130 and advances the process to step S1140. In step S1100 for the third page in an example shown in FIG. 10D, the print control section 1130 judges that the after-cleaning credit "11" is not less than the maximum page credit "10" (S1100: Yes), and skips steps S1110, S1120, and S1130 and advances the process to step S1140. In other words, when the after-cleaning credit "11" is not less than the maximum page credit "10", the next step is executed regardless of the IC credit on the assumption that the print can be performed. FIG. 10E shows an IC credit "7", a read credit "20", a used credit "14", and an after-cleaning credit "6" as an example of each credit at the time point at which step S1160 for the third page (a used credit 5) has been terminated, from a state shown in FIG. 10D.

Moreover, in step S1110, when it is judged that the IC credit is less that the maximum page credit (S1110: No), the print control section 1130 judges whether the IC credit is not more than "0" (S1200). In an example shown in FIG. 10E, the print control section 1130 judges that the IC credit "7" is less that the maximum page credit "10".

Next, in step S1200, when it is judged that the IC credit is more than "0" (S1200: No), the print control section 1130 adds the IC credit stored on the advance information holder 1054 via the advance information reading and writing section 1120 to the read credit and the after-cleaning credit in the read advance information storing section 1170 (S1210). Moreover, the print control section 1130 initializes (zero) the IC credit stored on the advance information holder 1054 via the advance information reading and writing section 1120 (S1220). In an example shown in FIG. 10E, the print control section 1130 judges that the IC credit "7" is more than "0", adds the IC credit "7" to the read credit "20" and the after-cleaning credit "6" (S1210), and initializes (zero) the IC credit, so as to go to a state shown in FIG. 10F.

The print control section 1130 judges whether an after-cleaning credit is not less than a maximum page credit (S1230). In step S1230, when the print control section 1130 judges that the after-cleaning credit is not less than the maximum page credit (S1230: Yes), the print control section 1130 informs the display section 1180 via the advance information reading and writing section 1120 of the effect that the credit is a bit. The informed display section 1180 displays the effect that the credit is a bit on the display 1014 (S1240). Then, the process advances to step S1140. In an example shown in FIG. 10F, the print control section 1130 judges that the after-cleaning credit "13" is not less than the maximum page credit "10" (S1230: Yes) and informs the display section 1180 of the effect that the credit is a bit, and the display section 1180 displays the effect that the credit is a bit on the display 1014 (S1240). Then, the process advances to step S1140 and the next page is printed. FIG. 10G shows an IC credit "0", a read credit "27", a used credit "22", and an after-cleaning credit "5" at the termination time in step S1160 for the fourth page (a used credit "8").

In step S1200, When it is judged that an IC credit is not more than "0" (S1200: Yes), the print control section 1130 informs the display section 1180 via the advance information reading and writing section 1120 of the effect that the credit is insufficient, and the display section 1180 displays the effect that the credit is insufficient on the display 1014 (S1250). In an example of FIG. 10G, the print control section 1130 judges that the IC credit "0" is not more than "0" and informs the display section 1180 via the advance information reading and writing section 1120 of the effect that the credit is insufficient, and the display section 1180 displays the effect that the credit is insufficient on the display 1014. Then, the print control section 1130 judges whether a new cartridge 1050 has been mounted (S1260). In addition, when the print control section 1130 accepts information that the cartridge 1050 has been mounted via the cartridge accommodating section 1110 and the advance information reading and writing section 1120, the print control section 1130 judges that the new cartridge 1050 has been mounted.

In step S1260, it is judged that the new cartridge 1050 has not been mounted (S1260: No), the print control section 1130 repeats the same step. In other words, the print control section 1130 waits until the new cartridge 1050 is mounted.

In step S1260, when it is judged that the new cartridge 1050 has been mounted (S1260: Yes), the print control section 1130 returns the process to step S1110. In an example shown in FIG. 11A, it is assumed that an IC credit of the newly mounted cartridge 1050 is 1000. In this case, there are obtained an IC credit "990", a read credit "37", a used credit "26", and an after-cleaning credit "11" as shown in FIG. 11B because the above steps S1110 to S1160 are executed for the fifth-page print.

In step S1170, when the print control section 1130 judges that the print for print job has been terminated (S1170: Yes), the print control section 1130 reads the after-cleaning credit via the advance information reading and writing section 1120 to add the read credit to the IC credit, and the advance information reading and writing section 1120 writes back the added credit in the advance information holder 1054 (S1180). Then the print control section 1130 initializes "zero" the read credit, the used credit, and the after-cleaning credit via the advance information reading and writing section 1120 (S1190). In an example shown in FIG. 11B, when the print control section 1130 judges that the print for print job has been terminated, the advance information reading and writing section 1120 writes back "1001" obtained by adding the after-cleaning credit "11" to the IC credit "990" in the advance information holder 1054, and goes to a state shown in FIG. 11C. Then, the present flowchart is terminated.

In this way, when a small quantity of IC credit not reaching a utility rate of the printer 1030 printing the next page remains behind in the cartridge 1050, the small quantity of IC credit can be used after mounting a new cartridge 1050. Moreover, the cartridge 1050 holds an IC credit, it is possible to control an amount to change a mechanical structure of the printer 1030.

In addition, in step S1230, when it is judged that the after-cleaning credit is less than the maximum page credit "10" (S1230: No), the print control section 1130 advances the process to step S1250. In other words, in case of printing a certain page, when a credit obtained by adding the IC credit and the after-cleaning credit does not reach the maximum page credit "10", the print control section 1130 waits until a new cartridge 1050 is mounted without printing this page (S1260).

Moreover, in the present flowchart, the advance information reading and writing section 1120 may read an IC credit corresponding to the number of discharges performed for a round of the print head 1040 as a reading unit of an IC credit from the advance information holder 1054 in place of an IC credit (a maximum page credit) corresponding to an amount of print of a page unit.

FIGS. 12A to 12D are pattern diagrams showing a change of each credit. In step S1260 (the fifth page) in a flowchart shown in FIG. 9, when an IC credit of the newly mounted cartridge 1050 is "8" rather than "1000", the printer executes steps S1110, S1200, S1210, S1220, S1230, S1240, S1140, S1150, S1160, S1170, S1180, and S1190, and terminates the present flowchart. In this way, although the new mounted cartridge 1050 holds a small quantity of IC credit, a user can use the small quantity of IC credit. FIG. 12A shows an IC credit "8", a read credit "27", a used credit "22", and an after-cleaning credit "5" at the time point at which the new cartridge 1050 is mounted (S1260: Yes). Moreover, FIG. 12B shows an IC credit "0", a read credit "35", a used credit "22", and an after-cleaning credit "13" at the termination time in step S1220 for the fifth page. Moreover, FIG. 12C shows an IC credit "0", a read credit "35", a used credit "26", and a after-cleaning credit "9" a the termination time in step S1160 for the fifth page (a used credit "4"). Moreover, FIG. 12D shows an IC credit "9", a read credit "0 (an initial value)" a used credit "0 (an initial value)", and an after-cleaning credit "0 (an initial value)" at the termination time in step S1190 for the fifth page (a used credit "4").

In addition when the IC credit of the newly mounted cartridge 1050 is "2" rather than "8", the printer executes steps S1110, S1200, S1210, S1220, S1230, and S1250, and waits until the new cartridge 1050 is mounted (S1260). In this way, although the new mounted cartridge 1050 holds a small quantity of IC credit, the small quantity of IC credit is added to an IC credit of a new cartridge 1050 that is further next mounted, and thus a user can use the small quantity of IC credit. In addition, when an IC credit of the newly mounted cartridge 1050 is "0", the printer makes the display 1014 display the effect that a credit is insufficient (S1250) and waits (S1260).

Figure 13:
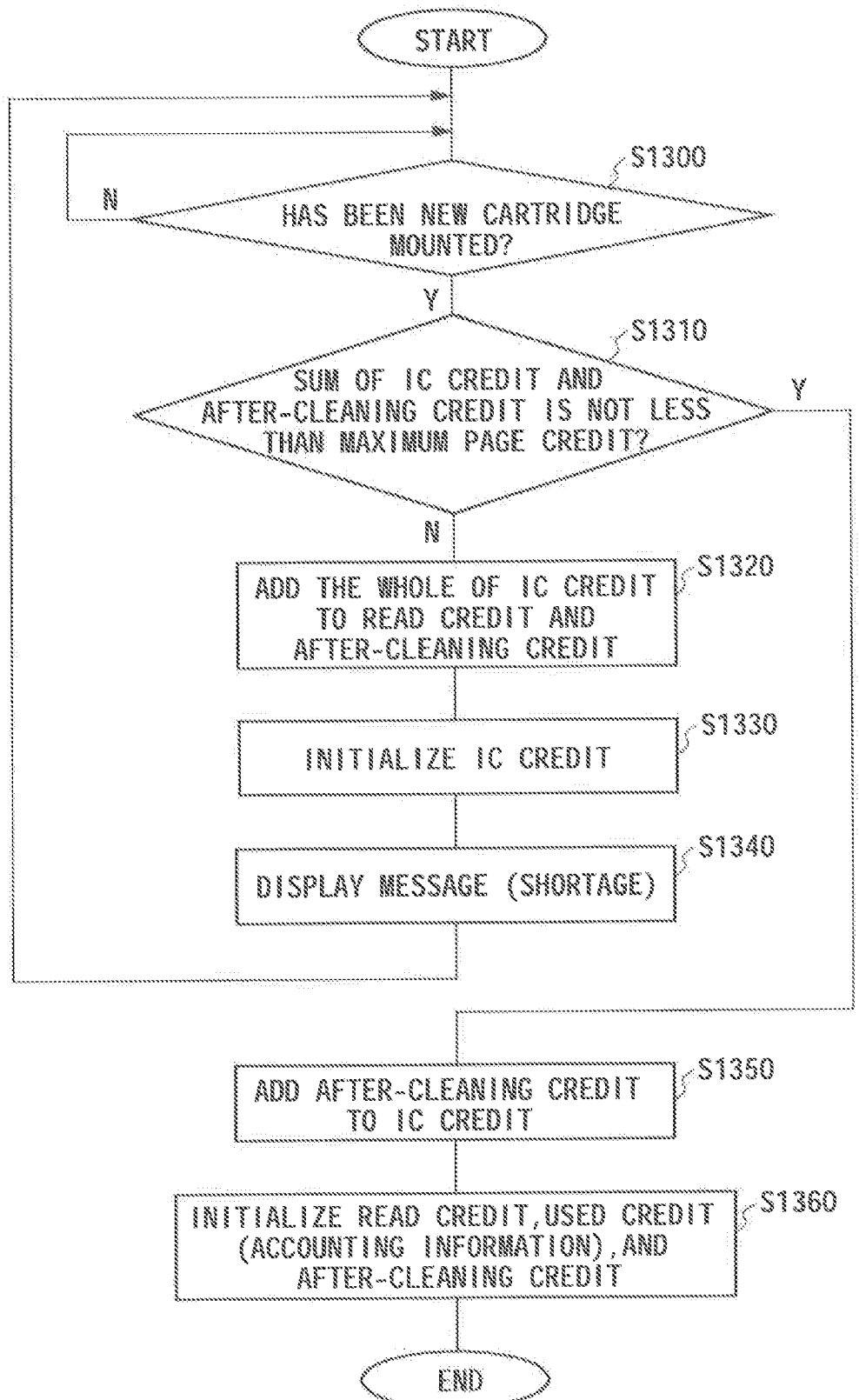
FIG. 13 is a flowchart exemplary showing an operation of a printer.

FIG. 13 is a flowchart exemplary showing an operation of the printer 1030 when a print job is canceled in step S1260 in a flowchart shown in FIG. 9 FIGS. 14A to 14D are pattern diagrams showing a change of each credit. A flowchart shown in FIG. 13 is started by canceling the print job in step S1260 in a flowchart shown in FIG. 9. In addition, credits at a start time in the present flowchart are respectively an IC credit "0", a read credit "27", a used credit "22", and an after-cleaning credit "5", as shown in FIG. 10G.

The print control section 1130 judges whether a new cartridge 1050 has been mounted (S1300). In step S1300, when it is judged that the new cartridge 1050 is not mounted (S1300: No), the print control section 1130 repeats the same step. In other words, the print control section 1130 waits until the new cartridge 1050 is mounted.

In step S1300, when the print control section 1130 judges that the new cartridge 1050 (the IC credit 1000) has been mounted (S1300: Yes), the print control section 1130 judges whether the sum "1005" of the IC credit "1000" and the after-cleaning credit "5" is not less than the maximum page credit "10" (S1310).

In step S1310, when the print control section 1130 judges that the sum "1005" of the IC credit "1000" and the after-cleaning credit "5" is not less than the maximum page credit "10" (S1310: Yes), the print control section 1130 adds the read after-cleaning credit "5" top the IC credit "1000" (S1350). Then, the print control section 1130 initializes "zero" the read credit, the used credit, and the after-cleaning credit via the advance information reading and writing section 1120 (S1360). Then, the present flowchart is terminated.

In this way, when a small quantity of IC credit not reaching a utility rate of the printer 1030 printing the next page remains behind in the cartridge 1050, a user can use the small quantity of IC credit after mounting the new cartridge 1050. Particularly, although canceling a print job when an IC credit became a small quantity not reaching a utility rate, a user can use the small quantity of IC credit after mounting the new cartridge 1050. FIG. 14A shows an IC credit "1000", a read credit "27", a used credit "22", and an after-cleaning credit "5" at the time point at which the new cartridge 1050 is mounted (S1300: Yes). Moreover, FIG. 14B shows an IC credit "1005", a read credit "0 (an initial value)", a used credit "0 (an initial value)", and an after-cleaning credit "0 (an initial value)" at the termination time in step S1360

In addition, in step S1300, when the print control section 1130 judges that the new cartridge 1050 (the IC credit "1") is mounted (S1300: Yes), the print control section 1130 judges that the sum "6" of the IC credit "1" and the after-cleaning credit "5" is less than the maximum page credit "10" (S1310: No), and adds the IC credit "1" to the read credit "27" and the after-cleaning credit "5" via the advance information reading and writing section 1120 (S1320). Moreover, the print control section 1130 initializes (zero) the IC credit "7" via the advance information reading and writing section 1120 (S1330). The print control section 1130 informs the display section 1180 of the effect that a credit is insufficient via the advance information reading and writing section 1120. The informed display section 1180 displays the effect that a credit is insufficient, on the display 1014 (S1340). Then, the process returns to step S1300. FIG. 14C shows an IC credit "1", a read credit "27", a used credit "22", and an after-cleaning credit "5" at the time point at which the new cartridge 1050 is mounted (S1300: Yes). Moreover, FIG. 14D shows an IC credit "0 (initialization)", a read credit "28", a used credit "22", and an after-cleaning credit "6" at the termination time in step S1340.

Moreover, in the flowcharts shown in FIGS. 9 and 13, the display section 1180 may display the effect that a credit is insufficient on the display 1034 in place of the display 1014 or in addition to the display 1014.

As above, according to the present embodiment, a printer system with a prepaid method can use a credit not reaching a predetermined unit. In addition, in the embodiment, although it is described that the advance information holder 1054 is an IC chip having a contact terminal and a memory, the holder is not limited to this. For example, the advance information holder 1054 is not limited to a contact type, and may be a non-contact type capable of reading and writing information, In this case, the advance information holder 1054 may be a magnetic or optical memory.

Moreover in the embodiment, although the advance information holder 1054 is attached to the cartridge 1050, the holder is not limited to this. For example, the advance information holder 1054 may be attached to a card. Specifically, the advance information holder 1054 may be an IC chip of an IC card, or may be a magnetic memory of a magnetic card. In this case, the printer 1030 includes a cart reading section. Moreover, for example, the advance information holder 1054 may be an outside advance information holder. For example, it may be a flash memory inserted into a terminal of the printer 1030.

Moreover, the printer 1030 may include a reading function in addition to a printing function in an integrated fashion. A printing function of the printer 1030 includes the cartridge accommodating section 1110, the advance information reading and writing section 1120, the prim control section 1130, the print section 1140, the print driving signal converting section 1150, the clearing section 1160, the read advance information storing section 1170, and the display section 1180, and may execute the above operation by accepting a print job from this reading function in addition to the personal computer 1010. Moreover, a part of the above functions may be realized by the personal computer 1010.

Moreover, in the present embodiment, although a printer of an ink-jet type has been described as the printer 1030, it may be a printer of another type. For example, the printer 1030 may be a printer of a laser beam type using toner as a color material. For example, in case of a printer of a laser beam type, the print driving signal converting section 1150 may convert a used credit based on a driving signal being output to a light source.

Figure 15:
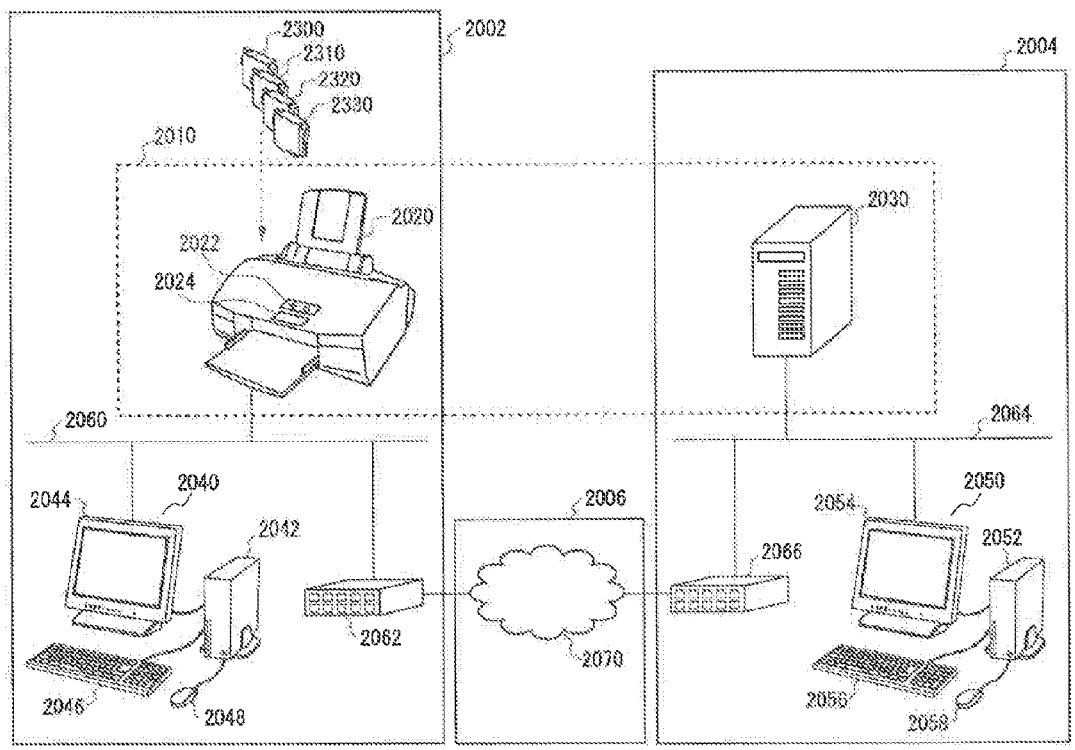
FIG. 15 is a view exemplary showing a used amount acquiring system.

FIG. 15 is a view exemplary showing a used amount acquiring system 2010 as further another embodiment of the present invention. The used amount acquiring system 2010 includes a minter 2020 connected to a LAN 2060 provided in a user business place 2002 and a server 2030 connected to a LAN 2064 provided in a service enterpriser business place 2004. The LAN 2060 in the user business place 2002 includes a personal computer 2040 for outputting a print job to the printer 2020 and a router 2062 that is an example of communication equipment for relaying data with a network outside the LAN 2060 in addition to the printer 2020. The LAN 2064 in the service enterpriser business place 2004 includes a personal computer 2050 that is a client of the server 2030 and a router 2066 that is an example of communication equipment for relaying data with a network outside the LAN 2064 in addition to the server 2030. In addition, an example of a service enterpriser providing the LAN 2064 is an enterpriser that manufactures and sales the printer 2020 or a dealer that is associated with this enterpriser.

The printer 2020 includes a carrying portion not shown for carrying a medium, a print head not shown for discharging a color material to the medium while reciprocating over the medium carried by the carrying portion, a control panel 2022 for accepting an operation from a user, and a display 2024 such as a liquid crystal for displaying circumstances of print. Moreover, the printer 2020 detachably accommodates cartridges 2300, 2310, 2320, and 2330 for accommodating ink. The cartridges 2300, 2310, 2320, and 2330 accommodate ink with black, cyan, magenta, and yellow.

The personal computer 2040 includes a main body 2042, a display 2044, a keyboard 2046, and mouse 2048. Similarly, the personal computer 2050 includes a main body 2052, a display 2054, a keyboard 2056, and a mouse 2058.

The printer 2020 stores TCP/IP software related to TCP/IP and a driver related to Ethernet (a registered trademark) (IEEE 802.3). Moreover, the printer 2020 stores an IP address for the server 2030. The printer 2020 generates a segment, datagram, and a frame using these, and sends these generated packets to the server 2030 via the router 2062, Internet 2070 that is an example of the network 2006, and the router 2066. Moreover, the printer 2020 has a timer therein, and thus can acquire the present date.

Figure 16:
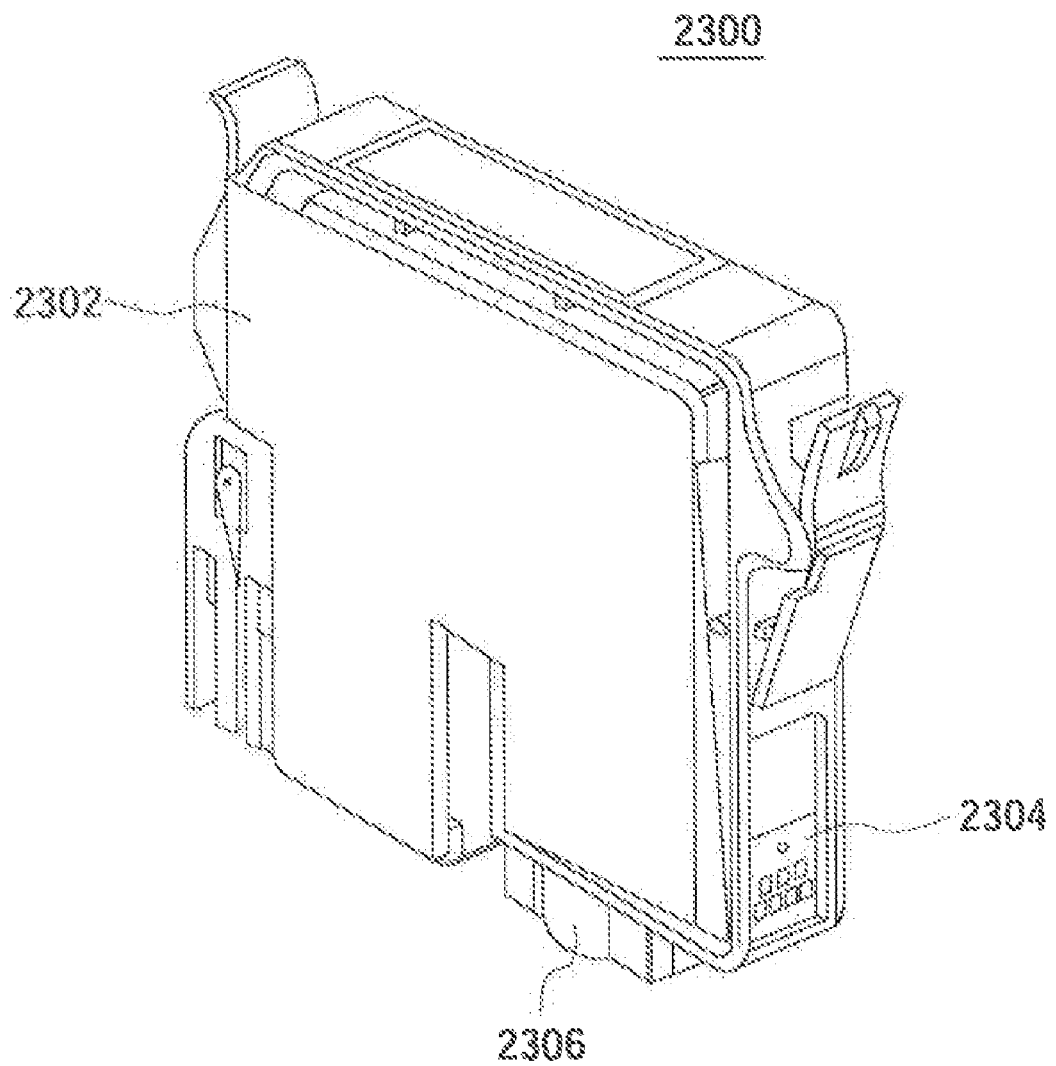
FIG. 16 is a perspective view showing a cartridge.

FIG. 16 is a perspective view showing the cartridge 2300. The cartridge 2300 includes as cartridge main body 2302 for accommodating ink, an ink supply port 2306 for supplying ink to the printer 2020, an advance information holder 2304 for storing advance information. The advance information holder 2304 is an IC chip including a contact terminal that is electrically contacted with a reading and writing section at the printer 2020 side and a memory that is electrically connected to this contact terminal and stores information.

The advance information holder 2304 stores a credit (hereinafter, a credit stored on the advance information holder 2304 is referred to as "an IC credit") that is advance information corresponding to a utility rate of the printer 2020. Specifically, a user of the printer 2020 purchases an IC credit stored on the advance information holder 2304 from an enterpriser that manufactures and sales the printer 2020, an enterpriser relevant to an enterpriser that manufactures and sales the printer 2020, or an enterpriser that resells the printer 2020. These enterprisers may previously prepare the advance information holder 2304 of which amounts of stored credit are different from one another and sell an IC credit stored on the advance information holder 2304 to a user at a price according to the stored IC credit, or may store an IC credit according to an amount of money paid by a user on the advance information holder 2304 and sell the IC credit stored on the advance information holder 2304 to the user. Moreover, the advance information holder 2304 stores an IC credit capable of being used in the present obtained by subtracting the accumulation of the IC credits consumed by the use of the printer 2020 from an IC credit purchased by a user.

In addition, when an IC credit gored on the advance information holder 2304 is sold, these enterprisers acquire information related to the sold IC credit. When previously preparing and selling the advance information holder 2304 of which the stored credit amounts are different from one another, these enterprisers hold information showing relation between the advance information holder 2304 and the stored IC credit.

Moreover, the advance information holder 2302 may store authentication data showing justice of an IC credit in addition to an IC credit. Moreover, the advance information holder 2304 may further store information related to a color of ink in addition to an IC credit. Moreover, the advance information holder 2304 may be detachably mounted to the cartridge main body 2302. In addition, the not-shown cartridges 2310, 2320, and 2330 include a cartridge main body for accommodating ink and an ink supply port for supplying ink to the printer 2020.

Figure 17:
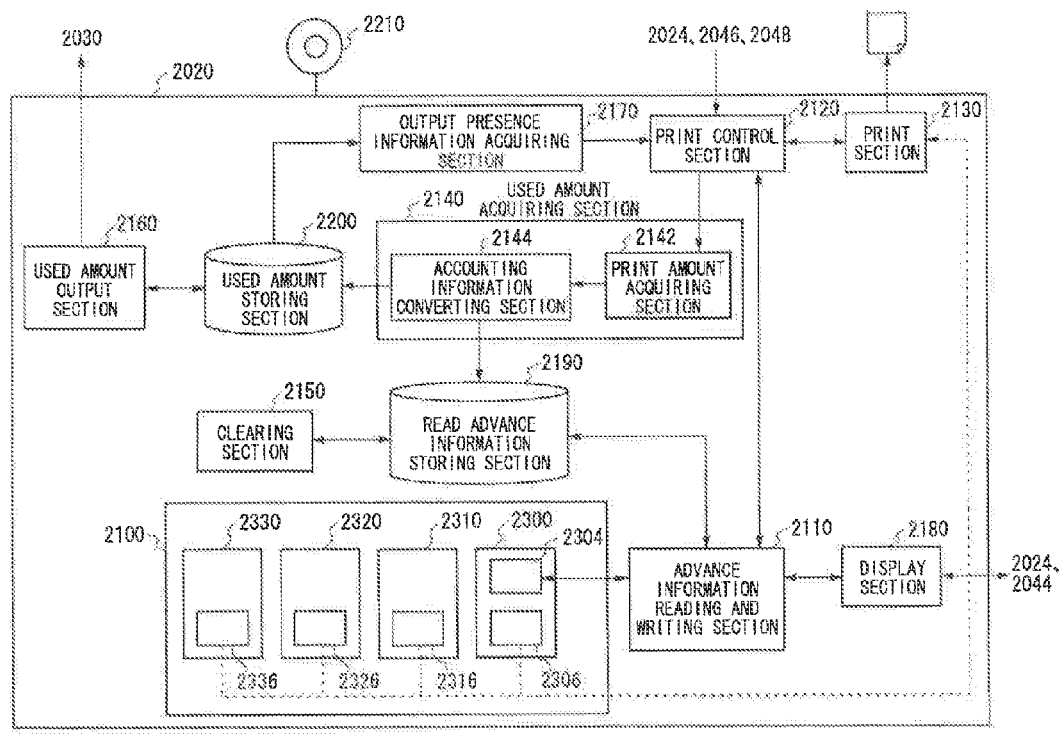
FIG. 17 is a block diagram exemplary showing a printer.

FIG. 17 is a block diagram exemplary showing the printer 2020. FIG. 18 is a view exemplary showing information stored on the read advance information storing section 2190. FIG. 19 is a view exemplary showing information stored on the used amount storing section 2200. As shown in FIG. 17, the printer 2020 includes a cartridge accommodating section 2100, an advance information reading and writing section 2110, a print control section 2120, a print section 2130, a used amount acquiring section 2140, a clearing section 2150, a used amount output section 2160, an output presence information acquiring section 2170, a display section 2180, a read advance information storing section 2190, and a used amount storing section 2200. The used amount acquiring section 2140 includes a print amount acquiring section 2142 and an accounting information converting section 2144.

The cartridge accommodating section 2100 detachably accommodates cartridges 2300, 2310, 2320, and 2330. Moreover, the cartridge accommodating section 2100 detects attachment and detachment for the cartridges 2300, 2310, 2320, and 2330.

The advance information reading and writing section 2110 reads and writes an IC credit from and in the advance information holder 2304 in the cartridge 2300 accommodated in the cartridge accommodating section 2100. Here, the advance information reading and writing section 2110 reads in IC credit corresponding to an amount of print of a page unit as a unit of reading an IC credit from the advance information holder 2304. Moreover, the advance information reading and writing section 2110 may read an IC credit corresponding to the number of discharges performed for a round of the print head in place of a reading unit of a page unit. Furthermore, even in any case of a page unit and a round unit, a constant value may be read as a reading unit, or an expected discharge number required for this print may acquired or computed every page and round movement, and a reading unit may be set and read every page and round movement based on the expected discharge number.

The read advance information storing section 2190 stores a read credit read from the advance information holder 2304, a used credit consumed by the use of the printer 2020, and an after-cleaning credit obtained by subtracting the used credit from the read credit. In an example shown in FIG. 18, the read advance information storing section 2190 stores a read credit "0 (an initial value)", a used credit "0 (an initial value)", and an after-cleaning credit "0 (an initial value)".

The print control section 2120 accepts a print job from the personal computer 2040, and outputs a print driving signal controlling print. For example, the print driving signal includes a signal related to a head shot controlling the print head. The print section 2130 has a print head and a carrying portion, and carries a medium by the carrying portion based on the print driving signal output from the print control section 2120 and discharges ink from the cartridges 2300, 2310, 2320, and 2330 to perform print while reciprocating the print head over the medium. In this case, the print head may discharge ink on both paths of coming and going paths, or may discharge ink on one path of coming and going paths.

The print amount acquiring section 2142 acquires a print amount showing an amount of print by the print section 2130. Specifically, the print amount acquiring section 2142 acquires a signal related to a head shot controlling the print head, which is included in the print driving signal output from the print control section 2120, and acquires the number of head shots required for print by the print section 2130 as a print amount.

The accounting information converting section 2144 computes and acquires a used credit that is accounting information obtained by converting the number of head shots based on the number of head shots acquired by the print amount acquiring section 2142. For example, the accounting information converting section 2144 previously stores conversion information showing that 10000 shots correspond to one credit.

The used amount storing section 2200 stores an output due date that is date and time at which a used credit should be output to the outside and an actual output date that is date and time at which the used credit has been output to the outside, as an example of output presence information showing whether the used credit acquired by the accounting information converting section 2144, the printer ID identifying the printer 2020, and the used credit by the used amount output section 2160 have been output to the outside. In an example shown in FIG. 19, the used amount storing section 2200 stores the printer ID "GP012345678", the output due date "2007.03.31 12:00", the actual output date "2006.03.31 12:00", and the used credit "0 (an initial value)". In addition, a printer ID may use, for example, a MAC address stored on a network card embedded in the printer 2020 or provided outside. When using a MAC address, the used amount storing section 2200 stores the MAC address read from the network card as a printer ID. In addition, an initial value of the output due date may be March 31 12:00 coming next to the present date. Moreover, an initial value of the actual output date may be NULL.

The used amount output section 2160 outputs the used credit stored by the used amount storing section 2200 to server 2030 in association with the printer ID. In addition, the used amount output section 2160 stores an IP address of the server 2030 that is an output destination.

The output presence information acquiring section 2170 acquires the output due date and the actual output date stored on the used amount storing section 2200 based on an instruction from the print control section 2120.

The clearing section 2150 clears the read credit stored on the read advance information storing section 2190 by the used credit converted by the accounting information converting section 2144. The display section 2180 displays an error message or the like on the display 2024.

The storage medium 2210 stores a program making the advance information reading and writing section 2110, the print control section 2120, the print section 2130, the used amount acquiring section 2140, the clearing section 2150, the used amount output section 2160, the output presence information acquiring section 2170, the display section 2180, the read advance information storing section 2190, and the used amount storing section 2200 operate. The printer 2020 makes the advance information reading and writing section 2110 or the like operate by installing the above program stored on the storage medium 2210. Furthermore, as another method, the printer 2020 may acquire such program via the network 2006.

Figure 20:
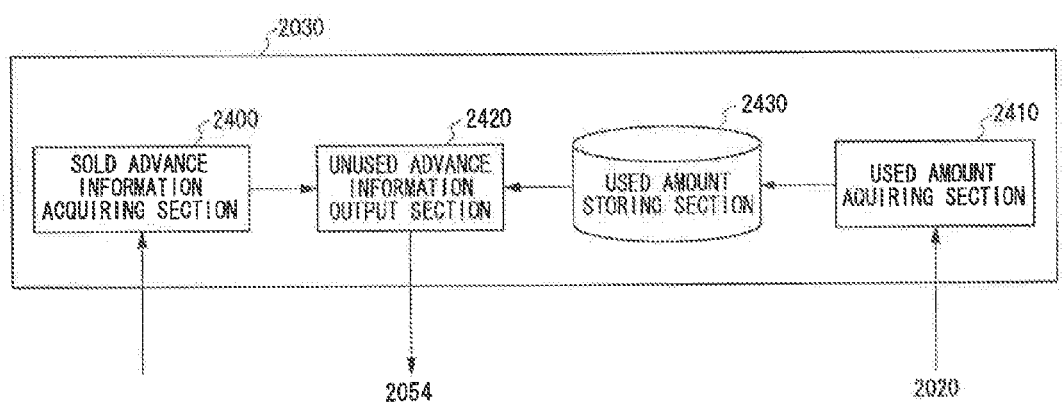
FIG. 20 is as block diagram exemplary showing a server.

FIG. 20 is a block diagram exemplary showing a server 2030. The server 2030 includes a sold advance information acquiring section 2400, a used amount acquiring section 2410, a unused advance information output section 2420, and a used amount storing section 2430. The sold advance information acquiring section 2400 acquires accumulated sold advance information obtained by accumulating the sold advance information. Specifically, the sold advance information acquiring section 2400 acquires an accumulated sold credit obtained by accumulating the sold IC credits.

The used amount acquiring section 2410 acquires the used credit from the printer 2020 in association with the printer ID. The used amount storing section 2430 stores the used credit in association with the printer ID.

The unused advance information output section 2420 subtracts the used credit stored on the used amount storing section 2430 from the accumulated sold credit acquired by the sold advance information acquiring section 2400, in order to compute a unused credit that is unused advance information of which a use has not been confirmed among the accumulated sold credits that have been sold. Then, the unused advance information output section 2420 outputs the computed unused credit.

Figure 21:
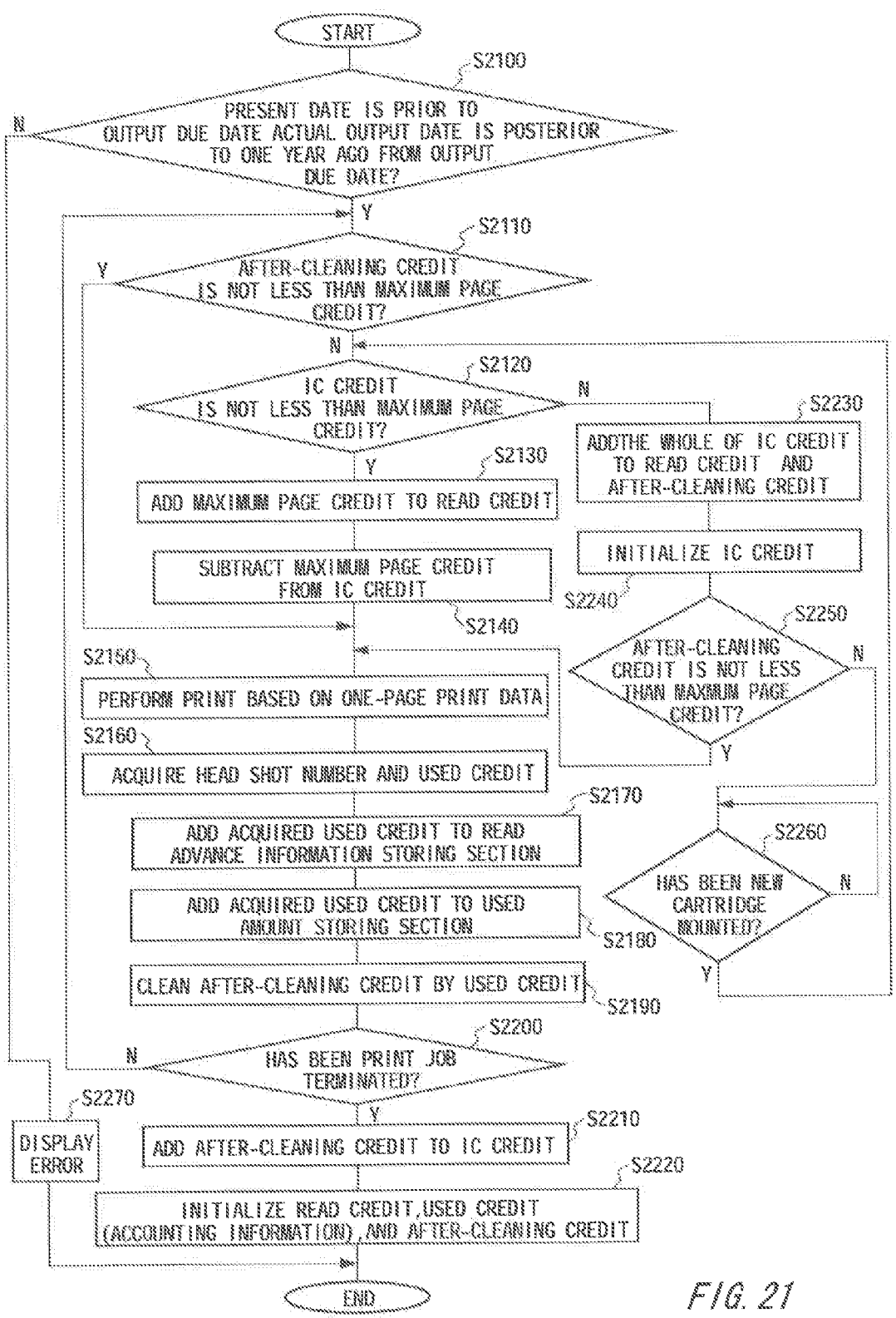
FIG. 21 is a flowchart exemplary showing an operation of a printer.

FIG. 21 is a flowchart exemplary showing an operation of the printer 2020. The present flowchart is started in response to the fact that the print control section 2120 in the printer 2020 receives a print job from the personal computer 2040. In addition, it is assumed that the present date is Jul. 3, 2006 17:00 and the output due date stored on the used amount storing section 2200 is Mar. 31, 2007 12:00. Moreover, in a start time of the present flowchart, the cartridge accommodating section 2100 accommodates the cartridges 2300, 2310, 2320, and 2330.

The print control section 2120 acquires the actual output date stored on the used amount storing section 2200 via the output presence information acquiring section 2170. The print control section 2120 judges whether the present date "Jul. 3, 2006 17:00" does not exceed the output due date "Mar. 31, 2007 12:00" and whether the acquired actual output date is the date and time after "Mar. 31, 2006 1200" corresponding to one year ago from the output due date "Mar. 31, 2007 12:00" (S2100). In step S2100, the print control section 2120 judges that the present date "Jul. 3, 2006 17:00" does not exceed the output due date "Mar. 31, 2007 12:00" and the acquired actual output date is the date and time after "Mar. 31, 2006 12:00" corresponding to one year ago from the output due date "Mar. 31, 2007 12:00" (S2100: Yes), the print control section 2120 reads the after-cleaning credit from the read advance information storing section 2190 via the advance information reading and writing section 2110 and judges whether the read after-cleaning credit is not less than the maximum page credit (S2110). In addition, the maximum page credit is a reading unit for the IC credit read by the advance information reading and writing section 2110, and means an IC credit corresponding to an amount of print of a page unit. For example, the maximum page credit may be a credit predetermined as a print amount when discharging ink on the whole of one page to perform print.

In step S2110, when it is judged that the read after-cleaning credit is less than the maximum page credit (S2110: No), the print control section 2120 judges whether the IC credit is not less than the maximum page credit (S2120).

In step S2120, when the print control section 2120 judges that the IC credit is not less than the maximum page credit (S2120: Yes), the print control section 2120 adds the maximum page credit to the read credit via the advance information reading and writing section 2110 (S2130). Moreover, the print control section 2120 subtracts the maximum page credit from the IC credit via the advance information reading and writing section 2110 (S2140). In other words, when it is judged that the maximum page credit can be moved from the IC credit to the read credit (S2120: Yes), the print control section 2120 moves the maximum page credit from the IC credit to the read credit (S2130 and S2140).

The print control section 2120 outputs a print driving signal for the first page to the print section 2130 based on the print job. The print section 2130 moves the print head based on the print driving signal output from the print control section 2120, and discharges ink from the cartridges 2300, 2310, 2320, and 2330, in order to perform print (S2150).

The print amount acquiring section 2142 acquires a signal related to a head shot required for the first-page print output from the print control section 2120 in step S2150, and acquires the number of head shots required to print the first page (S2160). The accounting information converting section 2144 computes and acquires a used credit based on the acquired number of head shots required to print the first page (the same step).

The accounting information converting section 2144 adds the used credit acquired in step S2160 to the used credit stored on the read advance information storing section 2190 (S2170). The accounting information converting section 2144 adds the used credit acquired in step S2160 to the used credit stored on the used amount storing section 2200 (S2180). Then, the accounting information converting section 2144 informs the clearing section 2150 of the effect that the used credit is added to the read advance information storing section 2190. The informed clearing section 2150 clears the read credit by the used credit (S2190).

The print control section 2120 judges whether the print for print job has been terminated (S2200). In step S2200, when the print control section 2120 judges that the print for print job has not been terminated (S2200: No), the process returns to step S2110.

On the other hand, in step S2110, when the print control section 2120 judges that the read after-cleaning credit is not less than the maximum page credit (S2110: Yes), the process skips steps S2120, S2130, and S2140, and advances to step S2150.

Moreover, in step S2120, when the print control section 2120 judges that the IC credit is less than the maximum page credit (S2120: No), the print control section 2120 adds the IC credit stored on the advance information holder 2304 to the read credit and the after-cleaning credit of the read advance information storing section 2190 via the advance information reading and writing section 2110 (S2230). Moreover, the print control section 2120 initializes (zero) the IC credit stored on the advance information holder 2304 via the advance information reading and writing section 2110 (S2240).

The print control section 2120 judges whether the after-cleaning credit is not less than the maximum page credit (S2250). In step S2250, when the print control section 2120 judges that the after-cleaning credit is not less than the maximum page credit (S2250: Yes), the process advances to step S2150. Moreover, the print control section 2120 informs the display section 2180 of the effect that the credit is a bit via the advance information reading and writing section 2110. The informed display section 2180 displays the effect that the credit is a bit on the display 2024.

On the other hand, in step S2250, when the print control section 2120 judges that the after-cleaning credit is less than the maximum page credit (S2250: No), the print control section 2120 informs the display section 2180 of the effect that the credit is insufficient via the advance information reading and writing section 2110. The informed display section 2180 displays the effect that the credit is insufficient on the display 2024. Then, the print control section 2120 judges whether a new cartridge 2300 has been mounted (S2260).

In step S2260, when the print control section 2120 judges that the new cartridge 2300 has not been mounted (S2260: No), the same step is repeated. In other words, the print control section 2120 waits until the new cartridge 2300 is mounted. In step S2260, when the print control section 2120 judges that the new cartridge 2300 has been mounted (S2260: Yes), the process returns to step S2120.

On the other hand, in step S2200, when the print control section 2120 judges that the print for print job has been terminated (S2200: Yes), the print control section 2120 reads the after-cleaning credit via the advance information reading and writing section 2110 and adds the read credit to the IC credit stored on the advance information holder 2304, in order to write back the credit (S2210). Then, the print control section 2120 initializes "zero" the read credit, the used credit, and the after-cleaning credit via the advance information reading and writing section 2110 (S2220). Then, the present flowchart is terminated.

On the other hand, in step S2100, the print control section 2120 judges that the present date "Jul. 3, 2006 17:00" does not exceed the output due date "Mar. 31, 2007 12:00" and the acquired actual output date is not the date and time after "Mar. 31, 2006 12:00" corresponding to one year ago from output due date "Mar. 31, 2007 12:00" (S2100: No), the print control section 2120 displays an error message that the print is not permitted and that the used credit should be manually output to the outside. Then, the present flowchart is terminated. In this way, since the print can be permitted on condition that the used credit of the printer 2020 is output, an offerer of the printer 2020 can grasp a used credit of the printer 2020 with high accuracy.

In addition, when the print control section 2120 is connected to the server 2030, the print control section 2120 may output a print driving signal. In this way, it is possible to always grasp a used credit of the printer 2020 when the printer 2020 is used.

Figure 22:
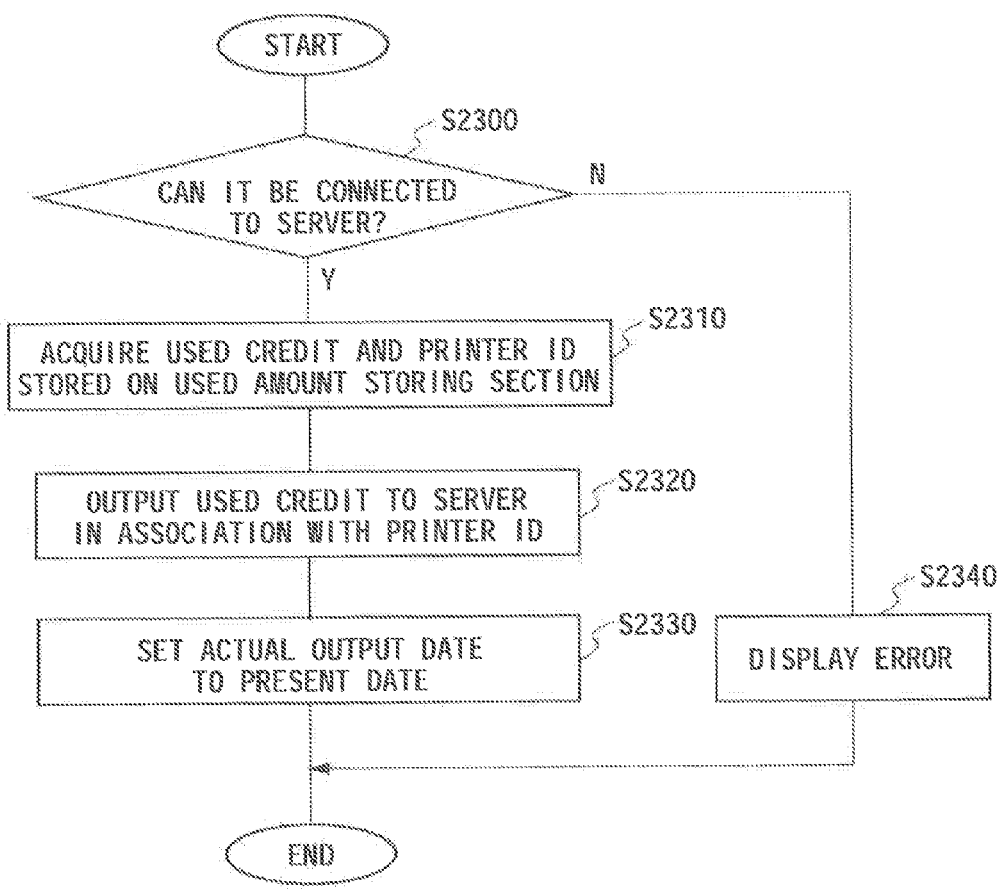
FIG. 22 is a flowchart exemplary showing an operation of a printer.

FIG. 22 is a flowchart exemplary showing an operation of the printer 2020. The present flowchart is started at the output due date. It is assumed that the present date is Mar. 31, 2007 12:00, the output due date stored on the used amount storing section 2200 is Mar. 31, 2007 12:00, and the actual output date stored on the used amount storing section 2200 is "2006.03.31 12:00". It is decided whether the used amount output section 2160 can be connected to the server 2030 via the Internet 70 (S2300).

In step S2300, when it is judged that the used amount output section 2160 can be connected to the server 2030 via the Internet 2070 (S2300: Yes), the used amount output section 2160 acquires the used credit and the printer ID stored on the used amount storing section 2200 (S2310). The used amount output section 2160 outputs the acquired used credit to the server 2030 in association with acquired printer ID (S2320). In this way, an offerer of the printer 2020 can grasp the presence or absence of the output of used credit according to a printer. Moreover, it is possible to grasp a used credit according to a printer.

Then, the used amount output section 2160 updates the actual output date "Mar. 31, 2006 12:00" stored on the used amount storing section 2200 to the present date "Mar. 31, 2007 12:00" (S2330). Furthermore, the used amount output section 2160 updates the output due date "Mar. 31, 2007 12:00" stored on used amount storing section 2200 to "Mar. 31, 2008 1200" that is "March 31 12:00" coming next to the present date "Mar. 31, 2007 12:00" (the same step). Then, present flowchart is terminated.

On the other hand in step S2300, when it is judged that the used amount output section 2160 cannot be connected to the server 2030 via the Internet 2070 (S2300: No), there is displayed an error that the section cannot be connected to the server 2030 (S2340). Then, the present flowchart is terminated.

In addition, the actual output date and the output due date updated by the used amount output section 2160 in step S2330 are referred to by the print control section 2120 in step S2100 in the flowchart shown in FIG. 21. In this way, since the print can be permitted on condition that a used credit is output, an offerer of the printer 2020 can grasp the used credit of the printer 2020 with high accuracy.

Moreover, the used credit output in step S2320 is acquired by the used amount acquiring section 2410 in the server 2030, and is stored on the used amount storing section 2430.

Moreover, although the process shown in the present flowchart has been described as an annual process for the printer 2020, the process may be a monthly process or a daily process. In this way, an offerer of the printer 2020 can grasp a used credit of the printer 2020 every predetermined period. Moreover, in place of this or in addition to this, the punter 2020 may start the process shown in the present flowchart according to a request accepted via a control panel 2022, a request from the personal computer 2040, or a request from the server 2030.

Figure 23:
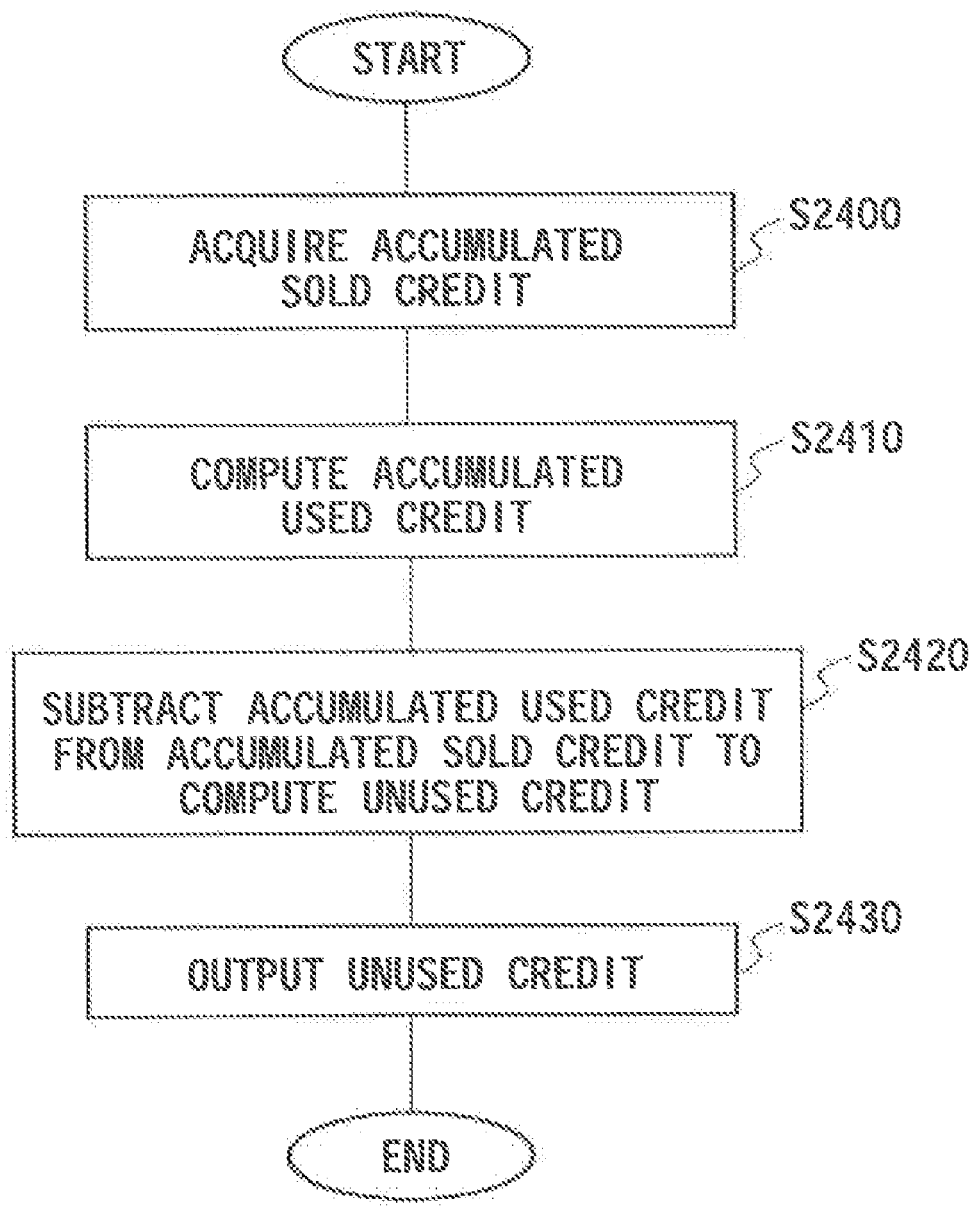
FIG. 23 is a flowchart exemplary showing an operation of a server.

FIG. 23 is a flowchart exemplary showing an operation of the server 2030. The present flowchart is started by the request from the personal computer 2050 connected to the LAN 2064. In addition, in a start time of the present flowchart, it is assumed that the used amount storing section 2430 stores the used credit acquired by the used amount acquiring section 2410.

The sold advance information acquiring section 2400 acquires an accumulated sold credit obtained by accumulating the sold IC credits (S2400). Specifically, the sold advance information acquiring section 2400 acquires the accumulated sold credit from an enterpriser that manufactures and sales the printer 2020, an enterpriser relevant to the enterpriser that manufactures and sales the printer 2020, or a point-of-sale system that acquires information related to an IC credit sold by an enterpriser or the like reselling the printer 2020 and a system that holds information showing relation between the advance information holder 2304 and the stored IC credit.

The unused advance information output section 2420 computes an accumulated used credit obtained by accumulating the used credits of a plurality of printer IDs corresponding to a plurality of printers 2020, which are stored on the used amount storing section 2430 (S2410). The unused advance information output section 2420 computes a unused credit by subtracting the computed accumulated used credit from the accumulated sold credit acquired by the sold advance information acquiring section 2400 (S2420). The unused advance information output section 2420 outputs the computed unused credit to the display 2054 of the personal computer 2050 (S2430). Then, the present flowchart is terminated. In addition, it is preferable that the present flowchart is annually executed, e.g., on April 1 after the flowchart shown in FIG. 22 is executed.

As above, according to the present embodiment, it is possible to grasp a used credit of the printer 2020. Particularly, an offerer of the printer 2020 can grasp a used credit of the printer 2020 by outputting the used credit of the printer 2020 to the offerer of the printer 2020.

In addition, in the embodiment, although the used amount storing section 2200 stores two date and time of an output due date and an actual output date and the print control section 2120 judges whether print is performed using these two date and time, the invention is not limited to this. As an example, when the printer 2020 does not need a management of an actual output date that is date and tune at which a used credit is output to the outside, the print control section 2120 may judge whether print is performed based on an output due date and a present date without storing an actual output date by the used amount storing section 2200. Moreover, as another example, when the printer does not need that a used credit is output to the outside at the same date and time for all users, the print control section 2120 may judge whether print is performed based on an actual output date and a present date without storing an output due date by the used amount storing section 2200.

In addition, in the embodiment, although printer 2020 outputs a used credit that is accounting information to the server 2030 as a used amount of the printer 2020, the invention is not limited to this. As an example, the printer may output the number of head shots, which is a print amount as a used amount of the printer 2020, to the server 2030. In other words, the used amount storing section 2200 may store the number of head shots acquired by the print amount acquiring section 2142 in place of a used credit acquired the accounting information converting section 2144, and the used amount output section 2160 may output the number of head shots stored on the used amount storing section 2200 to the server 2030.

In addition, in the embodiment, although the printer 2020 sends a used credit to the server 2030 through the Internet 2070, the invention is not limited to this. For example, the printer may send a used credit to the server 2030 through a public switched telephone network (PSTN) or a private line. Moreover, in the embodiment, although the printer 2020 is connected to the LAN 2060 in a user business place 2002, the invention is not limited to this. As an example, the printer 2020 may be provided in an individual user house that does not have an Internet connection environment by a personal computer. In this case, as an example, the printer may send a used credit to the server 2030 via ISP of a portable telephone enterpriser by means of data communication of a portable telephone.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention

What is claimed is:

1. A control method of a printer that has a cartridge accommodating section that detachably accommodates a cartridge for accommodating color materials and performs print on a medium by the color materials, comprising:
    reading and writing advance information from and in an advance information holder for storing the advance information;
    outputting a print driving signal controlling print when the advance information is read in the reading and writing step;
    performing a print by means of the color materials in the cartridge based on the output print driving signal;
    acquiring a used amount showing an amount by which the printer is used based on the output print driving signal;
    storing the acquired used amount; and
    outputting the stored used amount, wherein
    the storing step includes further storing output presence information showing whether the used amount has been output in the used amount outputting step, and
    the print driving signal outputting step includes outputting the print driving signal only when the output presence information is stored.

2. The control method as claimed in claim 1, wherein the used amount outputting step includes outputting the used amount in association with identification information identifying the printer.

3. The control method as claimed in claim 2, wherein the used amount acquiring step includes:
    acquiring a print amount showing an amount of print in the printing step, which is included in the output print driving signal; and
    acquiring accounting information converted from the print amount based on the acquired print amount, and
    the used amount storing step includes storing the accounting information acquired in the accounting information acquiring step as the used amount.

4. The control method as claimed in claim 2, wherein the used amount acquiring step includes acquiring a print amount showing an amount of print by the printing step, which is included in the acquired print driving signal, and
    the used amount storing step includes storing the print amount acquired in the used amount acquiring step as the used amount.

5. The control method as claimed in claim 1, wherein the used amount output step includes outputting the used amount at a predetermined date and time.

6. The control method as claimed in claim 5, wherein the used amount acquiring step includes:
    acquiring a print amount showing an amount of print in the printing step, which is included in the output print driving signal; and
    acquiring accounting information converted from the print amount based on the acquired print amount, and
    the used amount storing step includes storing the accounting information acquired in the accounting information acquiring step as the used amount.

7. The control method as claimed in claim 5, wherein the used amount acquiring step includes acquiring a print amount showing an amount of print by the printing step, which is included in the acquired print driving signal, and
    the used amount storing step includes storing the print amount acquired in the used amount acquiring step as the used amount.

8. The control method as claimed in claim 1, wherein the print driving signal outputting step includes outputting the print driving signal when the printer is connected to a server.

9. The control method as claimed in claim 8, wherein the used amount acquiring step includes:
    acquiring a print amount showing an amount of print in the printing step, which is included in the output print driving signal; and
    acquiring accounting information converted from the print amount based on the acquired print amount, and
    the used amount storing step includes storing the accounting information acquired in the accounting information acquiring step as the used amount.

10. The control method as claimed in claim 8, wherein the used amount acquiring step includes acquiring a print amount showing an amount of print by the printing step, which is included in the acquired print driving signal, and
    the used amount storing step includes storing the print amount acquired in the used amount acquiring step as the used amount.

11. The control method as claimed in claim 1, wherein the used amount acquiring step includes:
    acquiring a print amount showing an amount of print in the printing step, which is included in the output print driving signal; and
    acquiring accounting information converted from the print amount based on the acquired print amount, and
    the used amount storing step includes storing the accounting information acquired in the accounting information acquiring step as the used amount.

12. The control method as claimed in claim 1, wherein the used amount acquiring step includes acquiring a print amount showing an amount of print by the printing step, which is included in the acquired print driving signal, and
    the used amount storing step includes storing the print amount acquired in the used amount acquiring step as the used amount.

13. A printing apparatus, comprising:
    a cartridge accommodating section configured to detachably accommodate a cartridge for accommodating color materials configured to be printed on a medium;
    an advance information reading and writing section configured to read and write advance information from and in an advance information holder configured to store the advance information;
    a print control section configured to output a print driving signal controlling print when the advance information is read by the advance information reading and writing section;

a print section configured to perform a print by means of the color materials in the cartridge based on the output print driving signal;

a used amount acquiring section configured to acquire a used amount showing an amount by which the printing apparatus is used based on the output print driving signal;

a used amount storing section configured to store the acquired used amount; and a used amount output section configured to output the stored used amount, wherein the used amount storing section is configured to store output presence information showing whether the used amount has been output by the used amount output section, and the print control section is configured to output the print driving signal only when the output presence information is stored.

14. The apparatus as claimed in claim 13, wherein the used amount output section is configured to output the used amount in association with identification information identifying the printing apparatus.

15. The apparatus as claimed in claim 14, wherein
the used amount acquiring section is configured to:
acquire a print amount showing an amount of print performed by the print section, which is included in the output print driving signal; and
acquire accounting information converted from the print amount based on the acquired print amount, and
the used amount storing section is configured to store the acquired accounting information as the used amount.

16. The apparatus as claimed in claim 14, wherein
the used amount acquiring section is configured to acquire the used amount acquiring section is configured to a print amount showing an amount of print performed by the print section, which is included in the acquired print driving signal, and
the used amount storing section is configured to store the acquired print amount as the used amount.

17. The apparatus as claimed in claim 13, wherein the used amount output section is configured to output the used amount at a predetermined date and time.

18. The apparatus as claimed in claim 17, wherein
the used amount acquiring section is configured to:
acquire a print amount showing an amount of print performed by the print section, which is included in the output print driving signal; and
acquire accounting information converted from the print amount based on the acquired print amount, and
the used amount storing section is configured to store the acquired accounting information as the used amount.

19. The apparatus as claimed in claim 17, wherein
the used amount acquiring section is configured to acquire a print amount showing an amount of print performed by the print section, which is included in the acquired print driving signal, and
the used amount storing section is configured to store the acquired print amount as the used amount.

20. The apparatus as claimed in claim 13, wherein the print control section is configured to output the print driving signal when the printing apparatus is connected to a server.

21. The apparatus as claimed in claim 20, wherein
the used amount acquiring section is configured to:
acquire a print amount showing an amount of print performed by the print section, which is included in the output print driving signal; and
acquire accounting information converted from the print amount based on the acquired print amount, and
the used amount storing section is configured to store the acquired accounting information as the used amount.

22. The apparatus as claimed in claim 20, wherein
the used amount acquiring section is configured to acquire a print amount showing an amount of print performed by the print section, which is included in the acquired print driving signal, and
the used amount storing section is configured to store the acquired print amount as the used amount.

23. The apparatus as claimed in claim 13, wherein
the used amount acquiring section is configured to:
acquire a print amount showing an amount of print performed by the print section, which is included in the output print driving signal; and
acquire accounting information converted from the print amount based on the acquired print amount, and
the used amount storing section is configured to store the acquired accounting information as the used amount.

24. The apparatus as claimed in claim 13, wherein
the used amount acquiring section is configured to acquire a print amount showing an amount of print performed by the print section, which is included in the acquired print driving signal, and
the used amount storing section is configured to store the acquired print amount as the used amount.

* * * * *